United States Patent
Peters et al.

(10) Patent No.: US 12,134,512 B2
(45) Date of Patent: *Nov. 5, 2024

(54) RACKING SYSTEM AND METHOD

(71) Applicant: Integrated Automation Systems, LLC, Bedford Heights, OH (US)

(72) Inventors: Michael E. Peters, Ravenna, OH (US); Wesley Scott, Rootstown, OH (US); Michael P. McHugh, Solon, OH (US)

(73) Assignee: Integrated Automation Systems, LLC, Bedford Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,936

(22) Filed: Aug. 30, 2023

(65) Prior Publication Data
US 2023/0406607 A1 Dec. 21, 2023

Related U.S. Application Data

(63) Continuation of application No. 17/474,842, filed on Sep. 14, 2021, now Pat. No. 11,787,622.

(60) Provisional application No. 63/078,404, filed on Sep. 15, 2020.

(51) Int. Cl.
*B65D 85/48* (2006.01)
*B65G 13/00* (2006.01)

(52) U.S. Cl.
CPC ............. *B65D 85/48* (2013.01); *B65G 13/00* (2013.01)

(58) Field of Classification Search
None
See application file for complete search history.

(56) References Cited

U.S. PATENT DOCUMENTS

| | | |
|---|---|---|
| 4,548,135 A | 10/1985 | Kupczyk |
| 5,823,732 A | 10/1998 | Lisec |
| 7,217,077 B2 | 5/2007 | Mercure |
| 9,340,373 B2 | 5/2016 | McHugh et al. |
| 11,787,622 B2 * | 10/2023 | Peters .................... B65D 85/48 193/35 SS |

* cited by examiner

Primary Examiner — William R Harp
(74) Attorney, Agent, or Firm — KUSNER & JAFFE

(57) ABSTRACT

Manual and automated racking systems and associated methods for loading/unloading glass panels (e.g., insulating glass units (IGU), laminated glass units, glass composites, monolithic glass, and the like) onto/from a transportable rack, and a rack for use with the manual and automated racking systems.

12 Claims, 28 Drawing Sheets

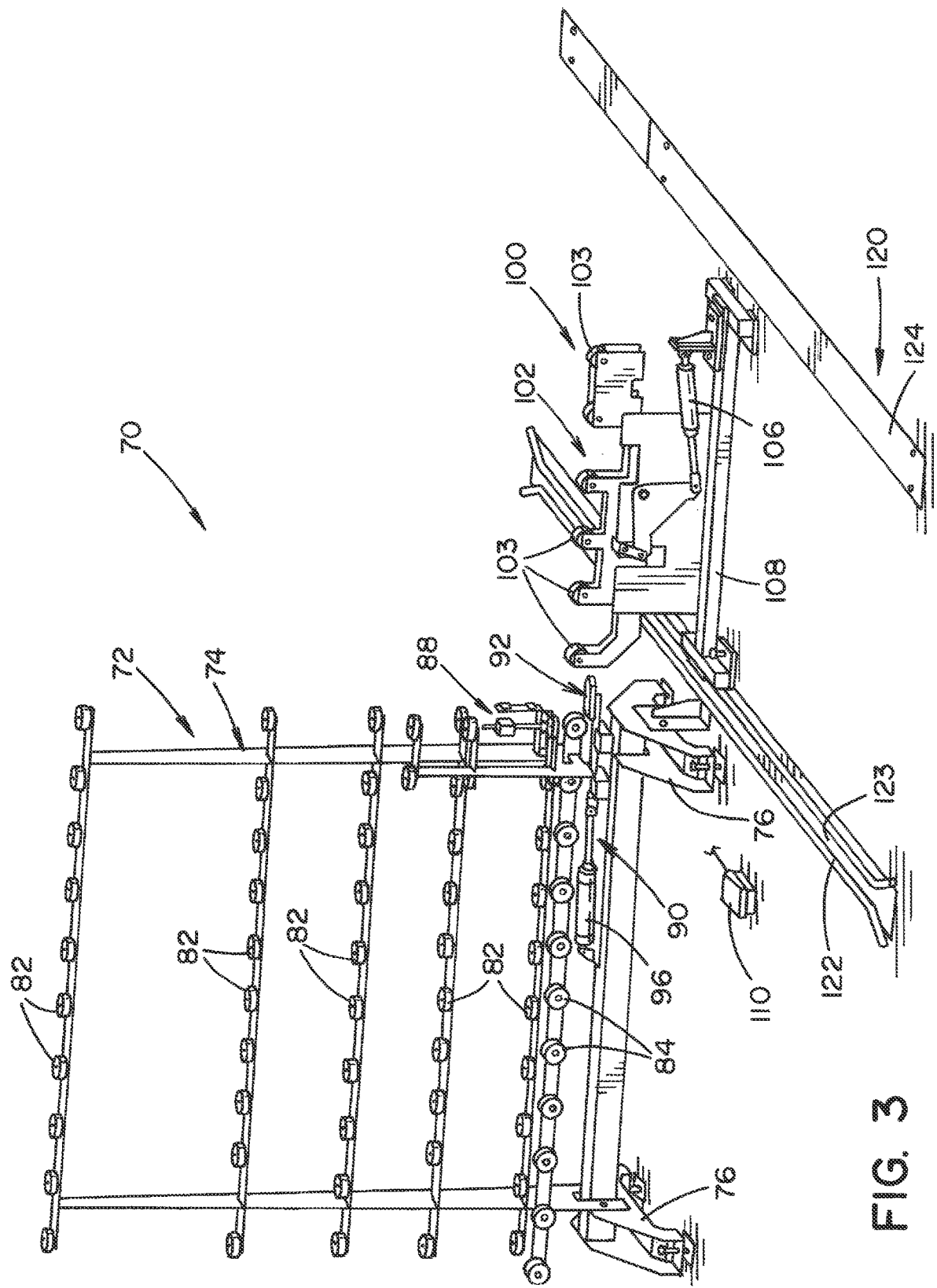

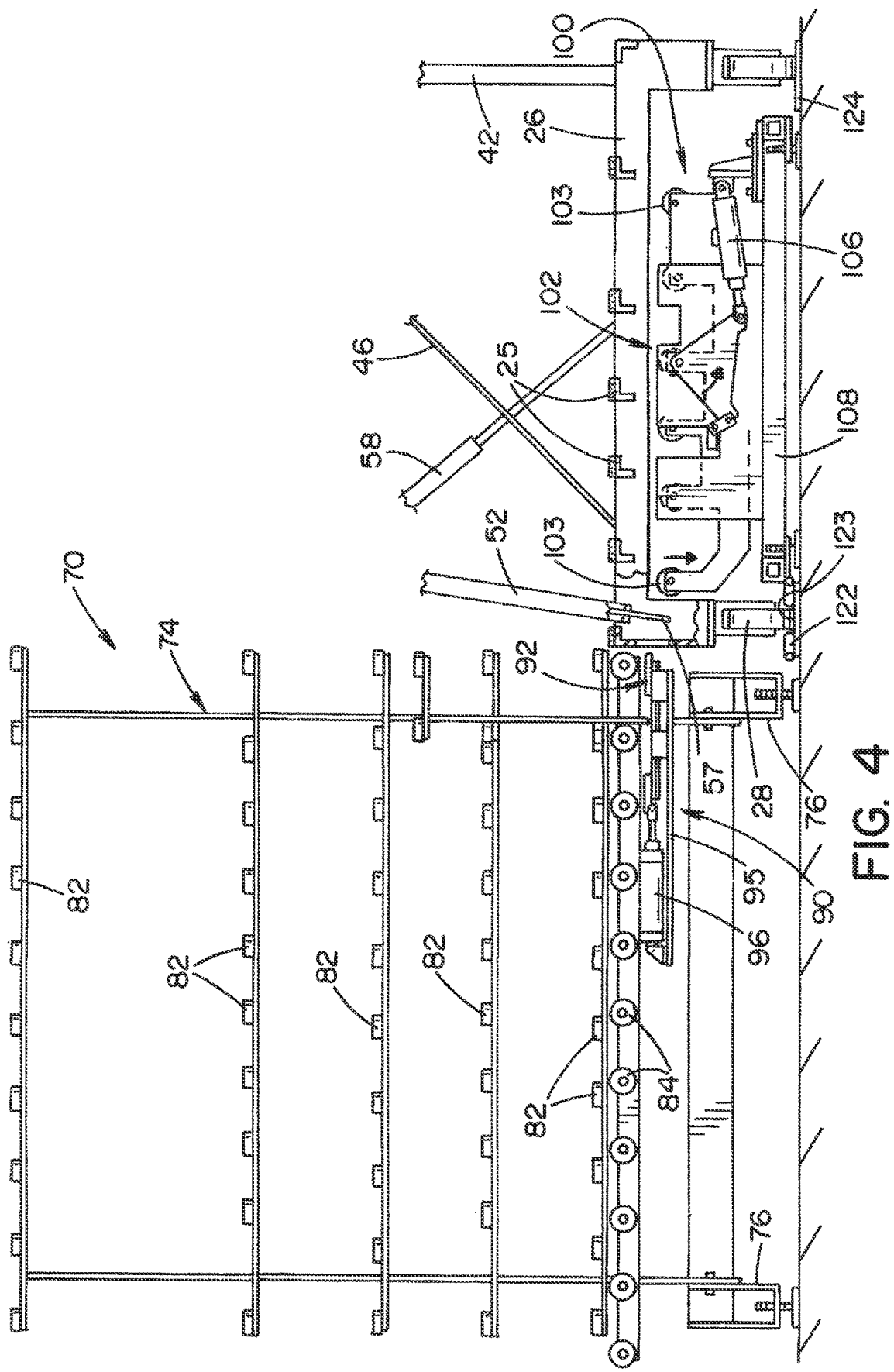

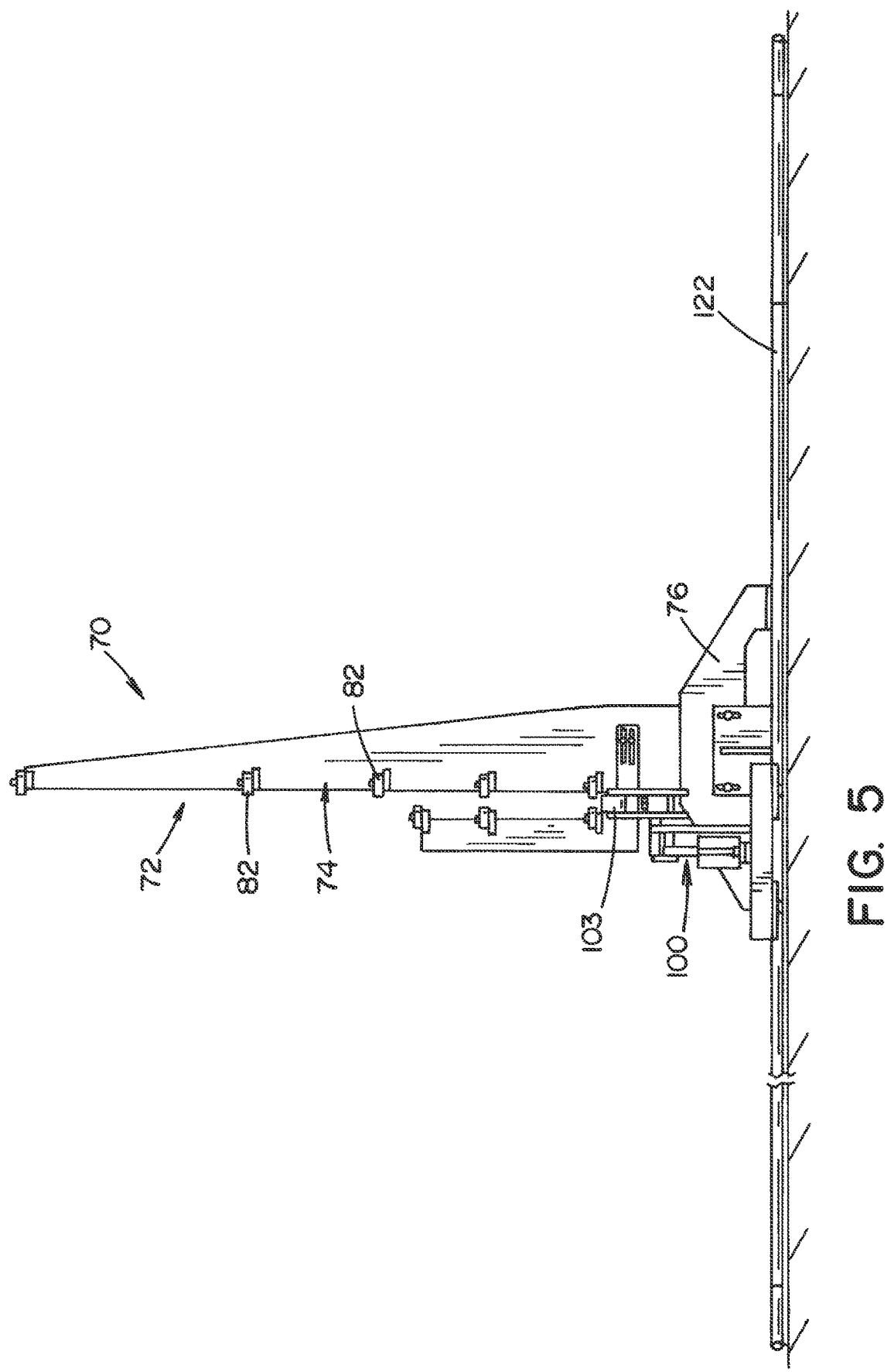

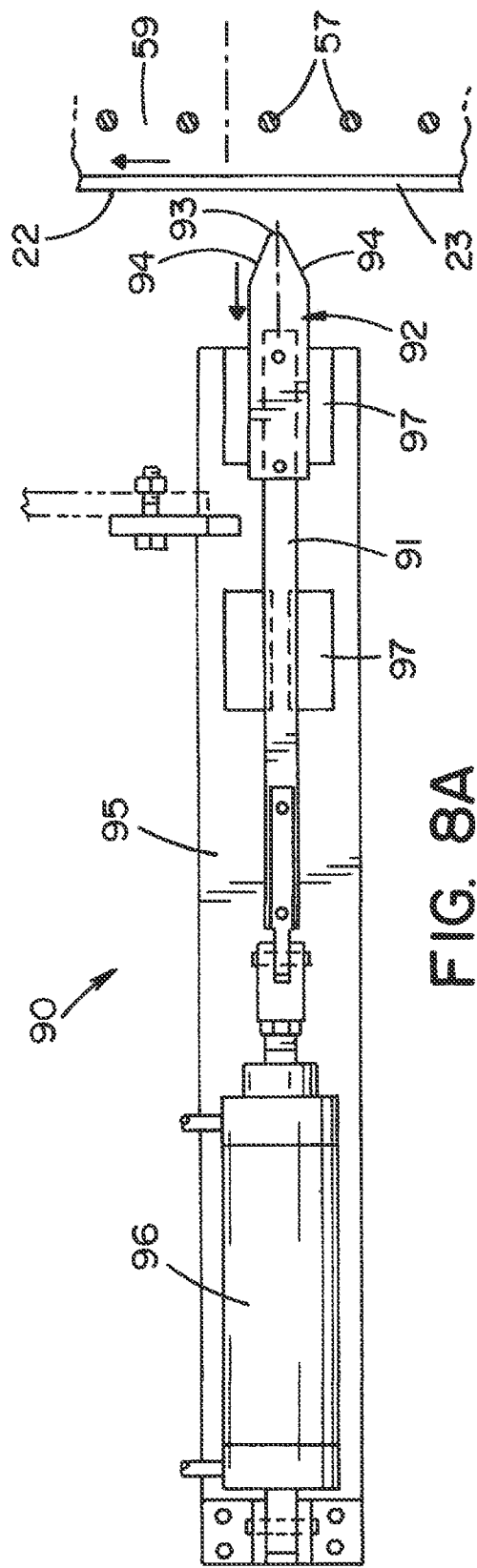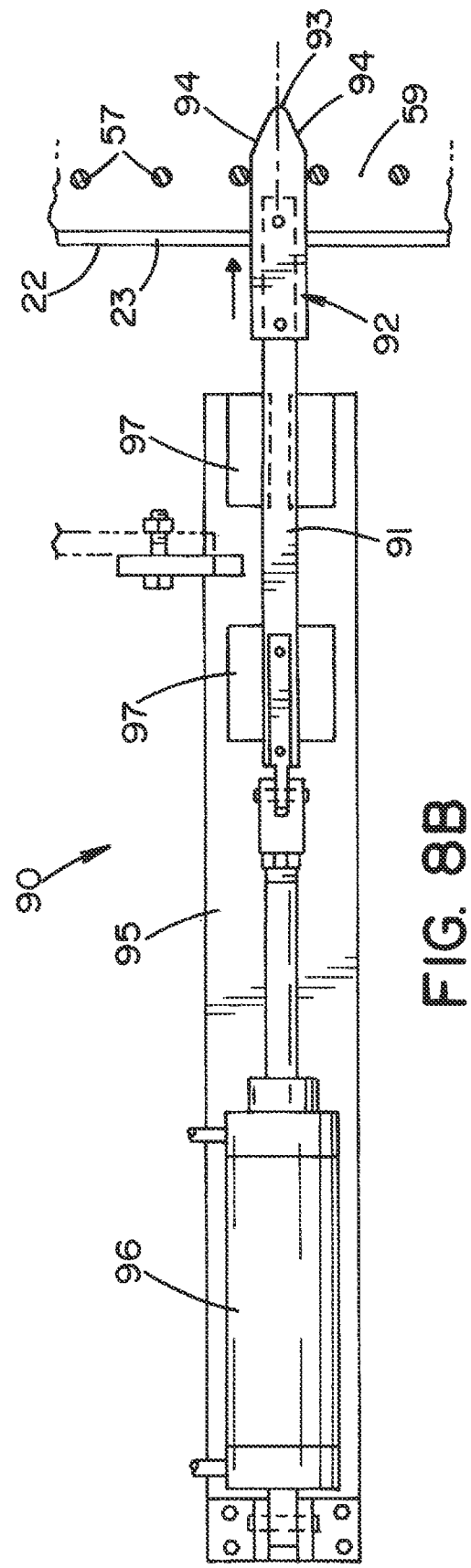

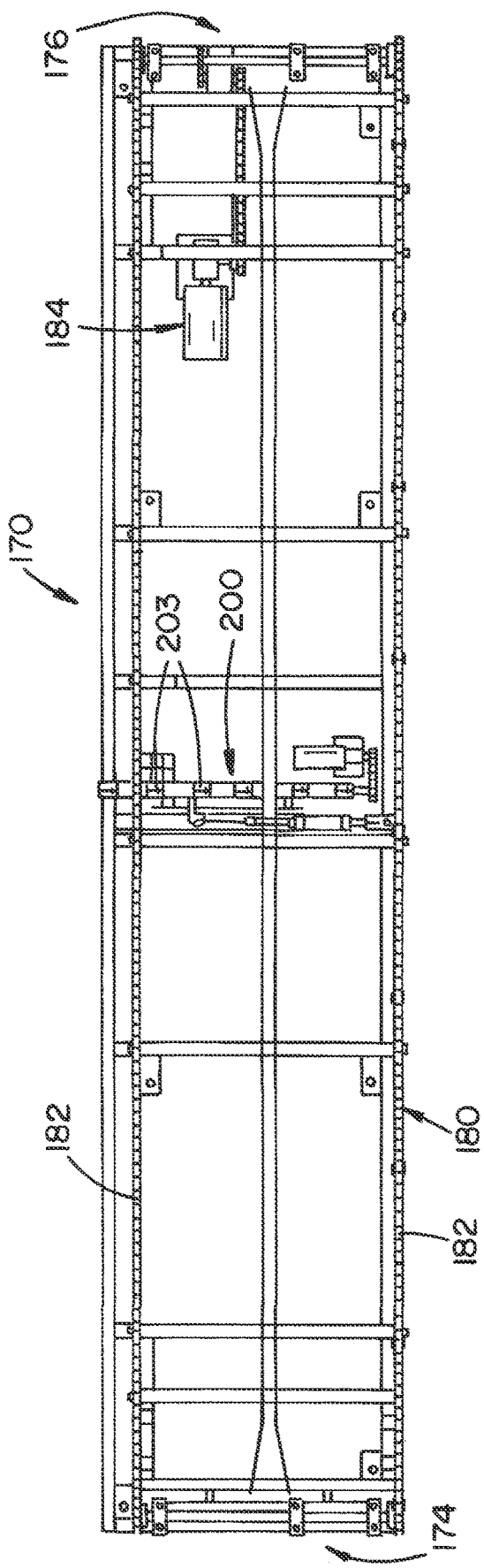
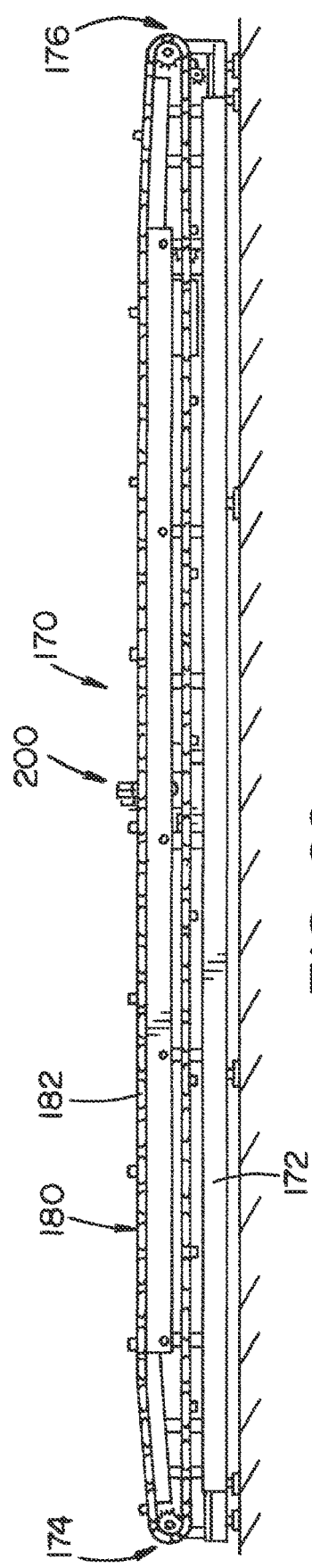
FIG. 19
FIG. 20

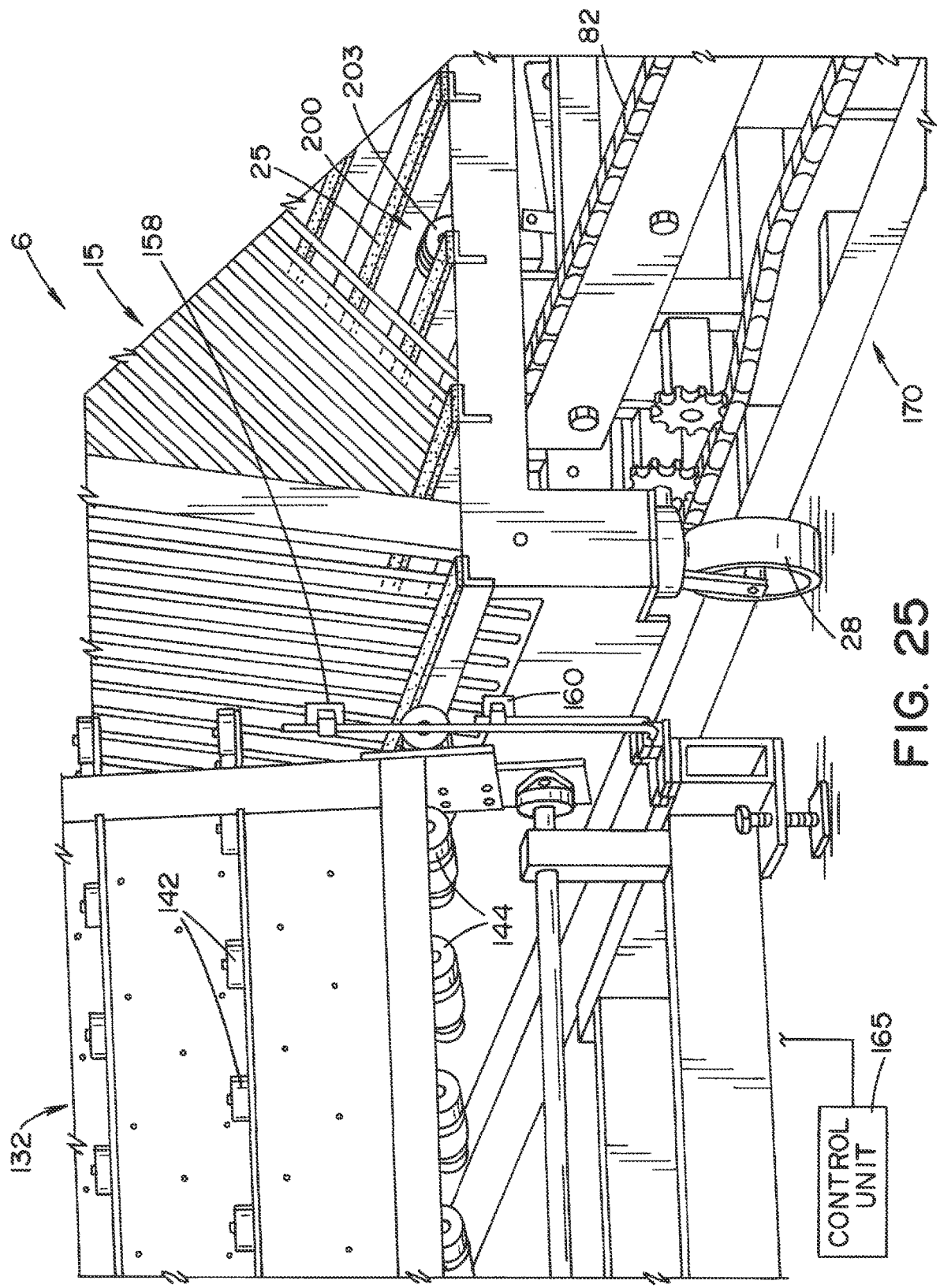

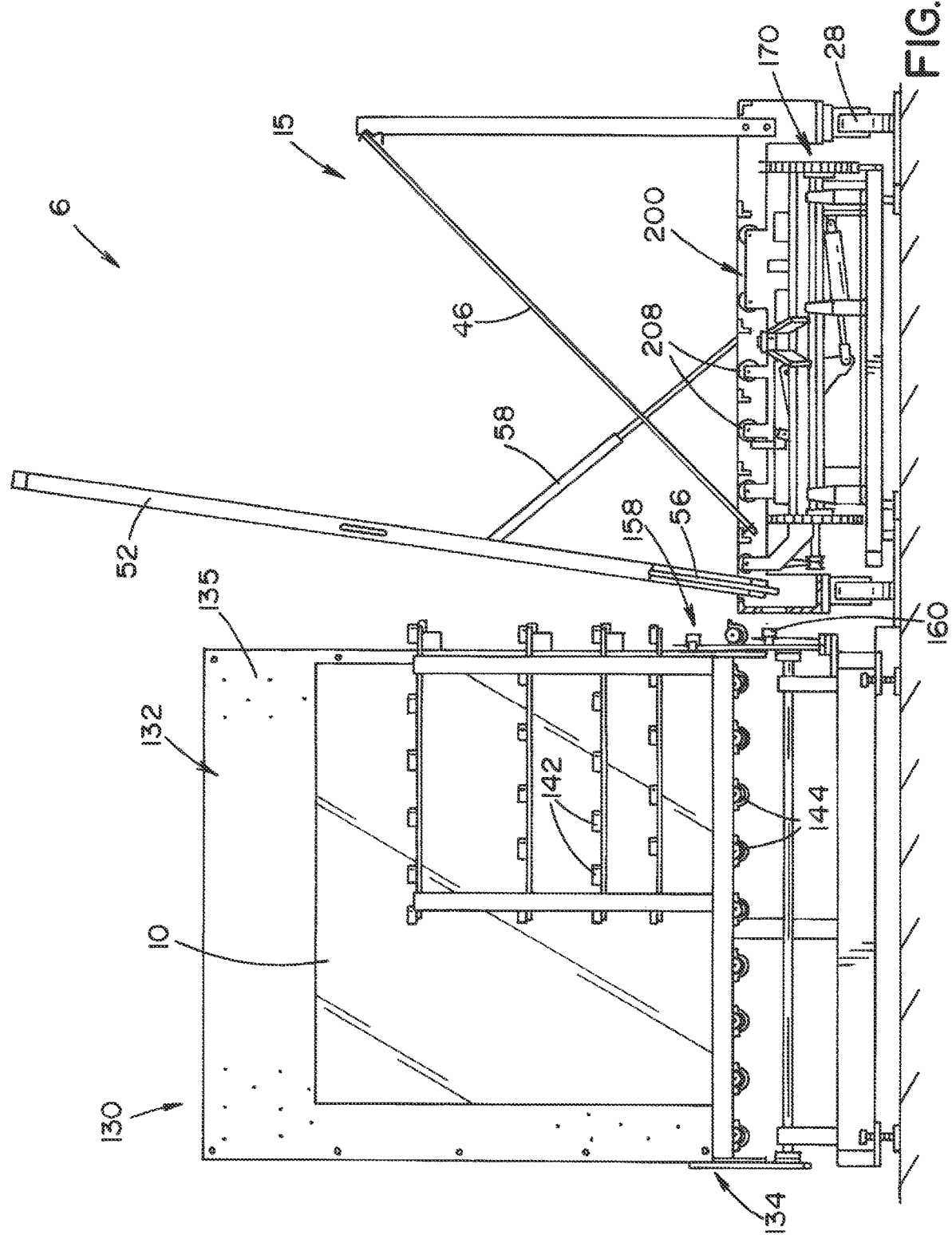

RACKING SYSTEM AND METHOD

RELATED APPLICATIONS

This application is a continuation of U.S. patent application Ser. No. 17/474,842, which claims the benefit of U.S. Provisional Application No. 63/078,404 filed Sep. 15, 2020, said applications hereby fully incorporated herein by reference.

FIELD OF THE INVENTION

The present invention relates generally to the field of article handling systems, and more particularly to a racking system and method for loading/unloading glass panels onto/from a transportable rack, said glass panels including, but not limited to, insulating glass units (IGU), laminated glass units, glass composites, monolithic glass, and the like.

BACKGROUND OF THE INVENTION

In the processing of glass panels, there is a continuing need for greater production efficiency, reductions in production costs and material waste, and improvements in product quality and worker safety. The apparatus and methods of the present invention addresses these and other industry needs.

SUMMARY OF THE INVENTION

In accordance with the present invention, there is provided a manual racking system and method for loading/unloading glass panels onto/from a transportable rack.

In accordance with another aspect of the present invention, there is provided an automated racking system and method for loading/unloading glass panels and the like onto/from a transportable rack.

In accordance with another aspect of the present invention, there is provided a rack for transport of glass panels, said rack useable with manual and/or automated racking systems.

In accordance with yet another aspect of the present invention, there is provided a rack for transporting glass panels, comprising: a base frame; a fixed rack member mounted to the base frame, said fixed rack including a plurality of spaced-apart rods that define a plurality of slots therebetween; and a pivoting rack member pivotally mounted to the base frame, thereby allowing the pivoting rack member to move relative to the fixed rack member between an upright position and a collapsed position, said pivoting rack member including a plurality of spaced-apart rods that align with the plurality of spaced-apart rods of the fixed rack member, said plurality of spaced-apart rods defining a plurality of slots therebetween.

In accordance with yet another aspect of the present invention, there is provided a conveyance system comprising: a conveyor including a support frame having a plurality of rollers mounted thereto; an indexing unit including an arm movable between a retracted position and an extended position; a pop-up roller assembly including a roller unit having a plurality of rollers, said roller unit movable between a lowered position and a raised position, wherein in the raised position, the plurality of rollers of the roller unit align linearly along a horizontal axis with the plurality of rollers mounted to the support frame; and an actuator for controlling movement of the arm between the retracted and extended positions and for controlling movement of the roller unit between the lowered and raised positions.

In accordance with still another aspect of the present invention, there is provided a racking system comprising: (a) a rack for transporting glass panels, said rack including: a base frame; a fixed rack member mounted to the base frame, said fixed rack including a plurality of spaced-apart rods that define a plurality of slots therebetween; and a pivoting rack member pivotally mounted to the base frame, thereby allowing the pivoting rack member to move relative to the fixed rack member between an upright position and a collapsed position, said pivoting rack member including a plurality of spaced-apart rods that align with the plurality of spaced-apart rods of the fixed rack member, said plurality of spaced-apart rods defining a plurality of slots therebetween; and (b) a conveyance system including: a conveyor including a support frame having a plurality of rollers mounted thereto; an indexing unit including an arm movable between a retracted position and an extended position; a pop-up roller assembly including a roller unit having a plurality of rollers, said roller unit movable between a lowered position and a raised position, wherein in the raised position, the plurality of rollers of the roller unit align linearly along a horizontal axis with the plurality of rollers mounted to the support frame; and an actuator for controlling movement of the arm between the retracted and extended positions and for controlling movement of the roller unit between the lowered and raised positions.

In accordance with still another aspect of the present invention, there is provided an automated racking system comprising: a conveyance system including a conveyor comprised of a support frame having a plurality of motor-driven rollers mounted thereto; a rack indexer assembly including a pop-up roller assembly having a roller unit comprised of a plurality of motor-driven rollers, said roller unit movable between a lowered position and a raised position, wherein in the raised position, the plurality of rollers of the roller unit align linearly along a horizontal axis with the plurality of rollers of the support frame; and a control unit for controlling operation of the conveyor and movement of the roller unit between the lowered and raised positions.

An advantage of the present invention is the provision of an automated racking system that allows racking and unracking of glass panels with minimal operator involvement.

Another advantage of the present invention is the provision of an automated racking system that allows faster production lines.

Another advantage of the present invention is the provision of an automated racking system that is adaptable for use with vertical and horizontal production lines.

Another advantage of the present invention is the provision of an automated racking system that minimizes operator handling of glass panels, thereby improving operator safety and minimizing damage to glass panels.

Another advantage of the present invention is the provision of an automated racking system that is adaptable to handle glass panels of various dimensions.

Another advantage of the present invention is the provision of an automated racking system that can be used to load and unload racks.

Another advantage of the present invention is the provision of an automated racking system that automatically indexes the position of a rack to allow continuous loading/unloading.

Another advantage of the present invention is the provision of an automated racking system that provides a simple operator control interface.

Still another advantage of the present invention is the provision of a manual racking system that can be used to load/unload glass panels onto/from racks.

Still an advantage of the present invention is the provision of a manual racking system that is low cost to manufacture.

Still another advantage of the present invention is the provision of a manual racking system that improves operator safety.

Still another advantage of the present invention is the provision of a manual racking system that reduces operator handling of the glass panels.

Still another advantage of the present invention is the provision of a manual racking system that has improved versatility.

Still another advantage of the present invention is the provision of a manual racking system that is adaptable to handle glass panels of various dimensions.

Still another advantage of the present invention is the provision of a manual racking system that facilitates alignment of a rack slot with a conveyance system.

A still further advantage of the present invention is the provision of a method for automated loading/unloading of glass panels onto/from a rack.

A still further advantage of the present invention is the provision of a method for manual loading/unloading of glass panels onto/from a rack.

These and other advantages will become apparent from the following description of illustrated embodiments taken together with the accompanying drawings and the appended claims.

BRIEF DESCRIPTION OF THE DRAWINGS

The invention may take physical form in certain parts and arrangement of parts, embodiments of which will be described in detail in the specification and illustrated in the accompanying drawings which form a part hereof, and wherein:

FIG. 3 is a perspective view of a manual conveyance system for a manual racking system, according to an embodiment of the present invention, said conveyance system including a vertical conveyor, a pop-up roller assembly, and a floor track assembly;

FIG. 4 is a front plan view of the conveyance system shown in FIG. 3;

FIG. 5 is a side plan view of the conveyance system shown in FIG. 3;

FIGS. 8A-8B illustrate operation of the indexing unit of FIG. 8 to index a rack with the manual conveyance system of FIG. 3;

FIG. 19 is a top plan view of the rack indexer assembly shown in FIG. 18;

FIG. 20 is a side plan view of the rack indexer assembly shown in FIG. 18;

FIG. 25 is an enlarged view of a portion of the automated racking system shown in FIG. 24; and FIG. 26 is a side plan view of the automated racking system shown in FIG. 24.

DETAILED DESCRIPTION OF THE INVENTION

Figure 1:
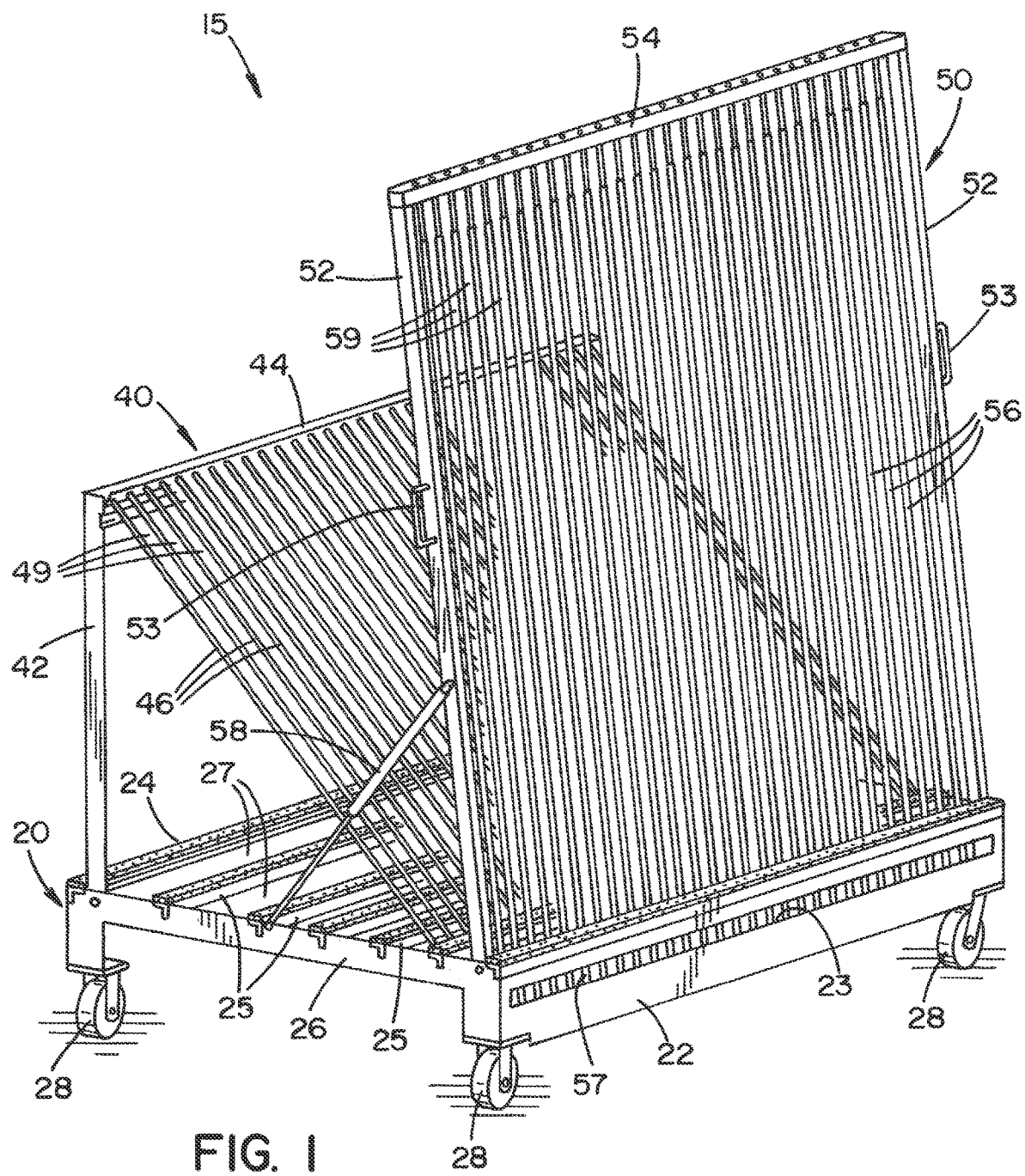
FIG. 1 is a perspective view of a rack according to an embodiment of the present invention.
Figure 2:
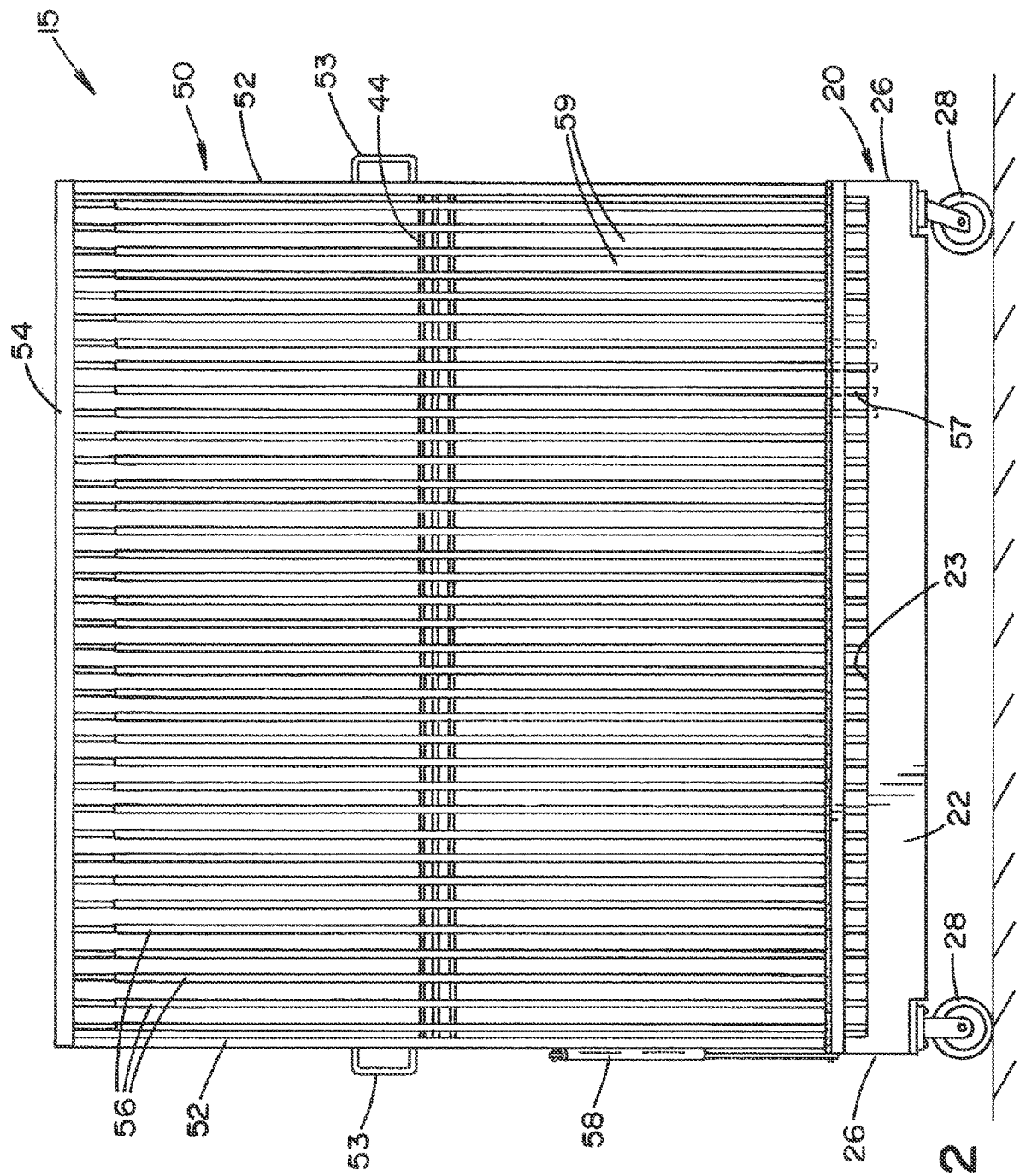
FIG. 2 is a front plan view of the rack shown in FIG. 1.

Referring now to the drawings wherein the showings are for the purposes of illustrating embodiments of the invention only and not for the purposes of limiting same, FIGS. 1 and 2 illustrate a rack 15 according to an embodiment of the present invention. Rack 15 is used with the manual and automated racking systems described herein. In the illustrated embodiment, rack 15 takes the form of a harp rack. Rack 15 may also take the form of a slat rack or the like.

Figure 2A:
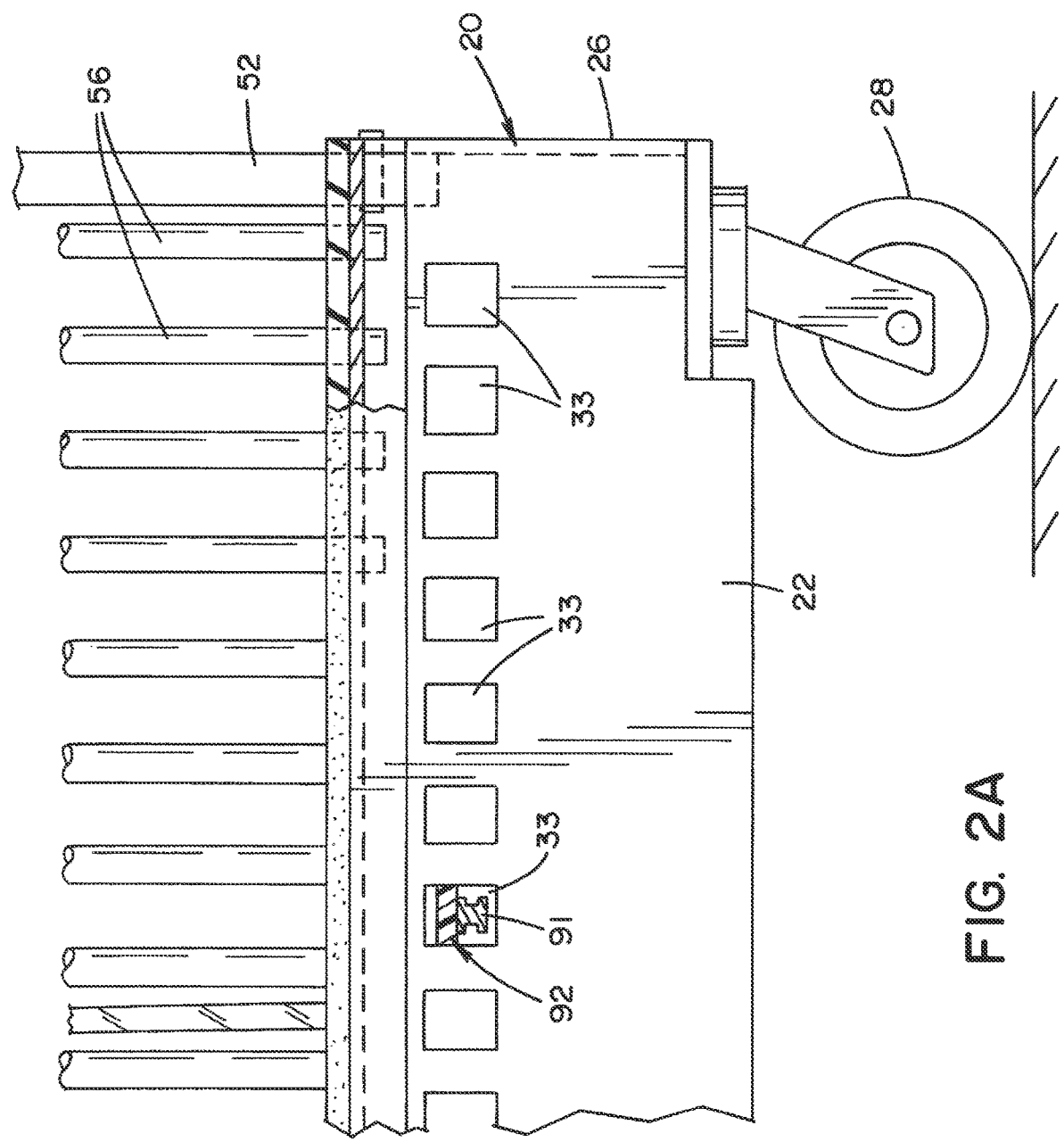
FIG. 2A shows a base frame front support according to an alternative embodiment.

Rack 15 is generally comprised of a base frame 20, a fixed rack member 40 mounted to base frame 20, and a pivoting rack member 50 mounted to base frame 20. Base frame 20 includes a front support 22 having an aperture 23, a rear support 24, a pair of side supports 26, and a plurality of spaced-apart cross supports 25 extending between side supports 26. The top surfaces of cross supports 25 preferably have a protective layer formed thereon. For example, the protective layer may take the form of a thin foam padding or the like. Openings 27 are provided in base frame 20 between adjacent cross supports 25, and between cross supports 25 and front and rear supports 22, 24. Wheels 28 are mounted at the corners of base frame 20. In the illustrated embodiment, wheels 28 are caster wheels. In accordance with an alternative embodiment of rack 15, aperture 23 of front support 22 is replaced with a plurality of spaced openings 33, as shown in FIG. 2A.

Fixed rack member 40 includes a pair of vertical posts 42 and a horizontal bar 44 extending between the top ends of vertical posts 42. Fixed rack member 40 also includes a plurality of spaced-apart rods 46 extending between horizontal bar 44 and a cross support 25, at an angle of approximately 45° relative to side supports 26. Rods 46 preferably have a protective plastic coating. Rods 46 are spaced from each other at a distance suitable for receiving glass panels of a desired dimension between a pair of rods 46. The spaces between rods 46 are referred to herein as slots. Accordingly, rods 46 define a plurality of slots 49 therebetween.

Pivoting rack member 50 includes a pair of vertical posts 52, an upper horizontal bar 54 and a lower horizontal bar (not shown). In the illustrated embodiment, each vertical post 52 has a handle 53. Pivoting rack member 50 also includes a plurality of spaced-apart rods 56 extending between upper horizontal bar 54 and the lower horizontal bar. Rods 56 preferably have a protective plastic coating. Rods 56 are spaced from each other at a distance suitable for receiving glass panels of a desired dimension between a pair of rods 56. The spaces between rods 56 are referred to herein as slots. Accordingly, rods 56 define a plurality of slots 59 therebetween. Rods 56 are spaced apart to align with rods 46 of fixed rack member 40. As a result, slots 59 of pivoting rack member 50 are aligned in correspondence with slots 49 of fixed rack member 40. In the illustrated embodiment, lower end portions 57 of rods 56 are visible and physically accessible through opening 23 of front support 22, as best seen in FIG. 2.

The lower end of pivoting rack member 50 is pivotally attached to side supports 26 of base frame 20, thereby allowing pivoting rack member 50 to move relative to fixed rack member 40. A telescoping extension arm 58 connects one of the vertical posts 52 of pivoting rack member 50 to the adjacent side support 26. Extension arm 58 supports pivoting rack member 50 in an upright position as shown in FIG. 1, and allows pivoting rack member 50 to be manually movable to a collapsed position wherein rods 56 of pivoting rack member 50 are positioned substantially parallel to rods 46 of fixed rack member 40.

Referring now to FIGS. 3-8, a manual conveyance system 70 will be described. Manual conveyance system 70 is generally comprised of a vertical conveyor 72, a laser guide 88, an indexing unit 90, a pop-up roller assembly 100, and a floor track assembly 120.

Vertical conveyor 72 includes a support frame 74 and legs 76. Vertical rollers 82 and horizontal rollers 84 are mounted to support frame 74. Vertical rollers 82 rotate about a vertical axis, while horizontal rollers 84 rotate about a horizontal axis. Rollers 82 and 84 are used to move a glass panel, as will be described in detail below. It should be appreciated that according to an alternative embodiment of manual conveyance system 70, horizontal rollers 84 may be driven by a motor-driven belt system (not shown).

Laser guide 88 and indexing unit 90 are mounted to vertical conveyor 72. Laser guide 88 facilitates alignment of a rack 15 with vertical conveyor 72, as will be explained below. Laser guide 88 emits a laser beam to assist an operator in alignment of a rack 15 in relation to vertical conveyor 72, as discussed below.

Figure 8:
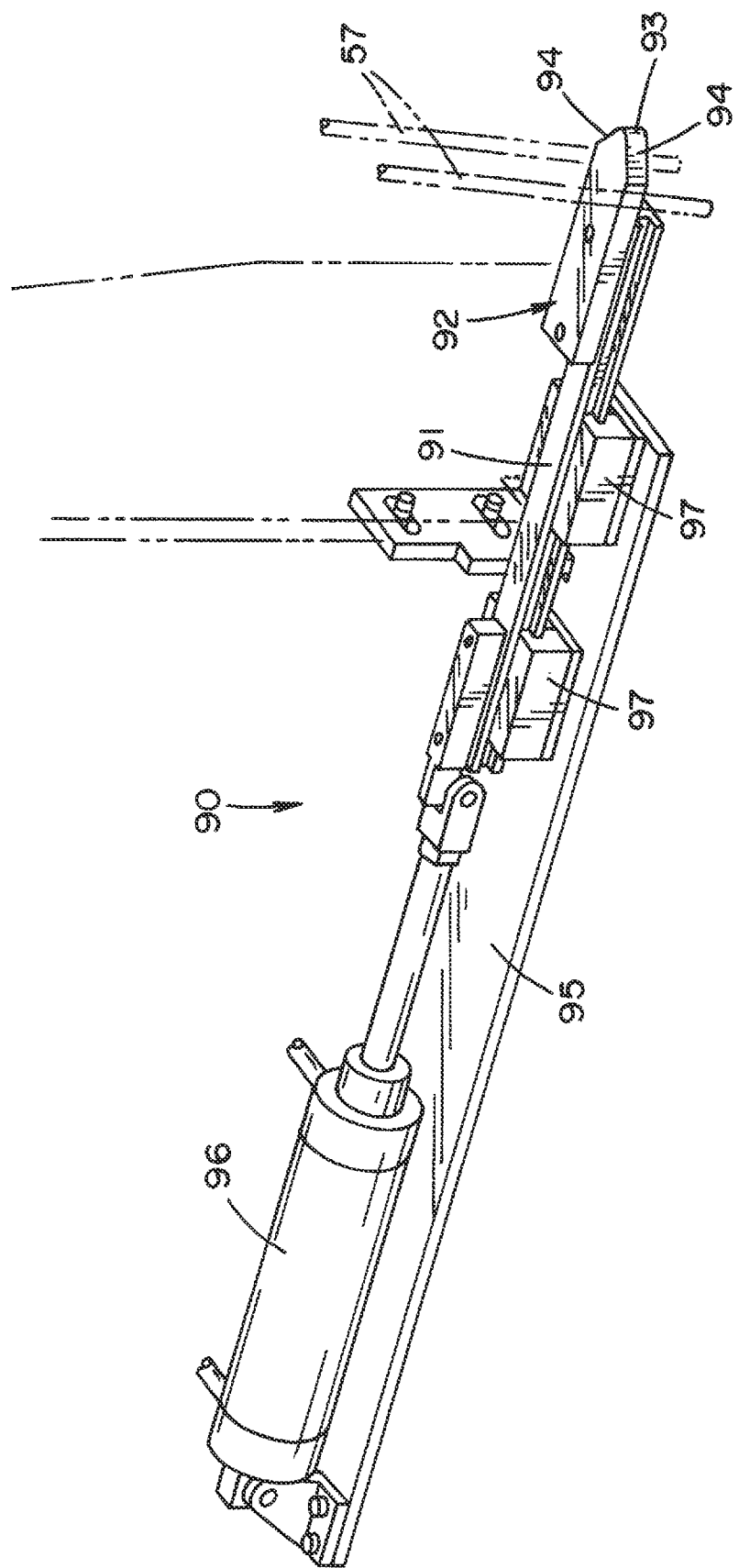
FIG. 8 is a perspective view of an indexing unit of the manual conveyance system shown in FIG. 3.
Figure 9:
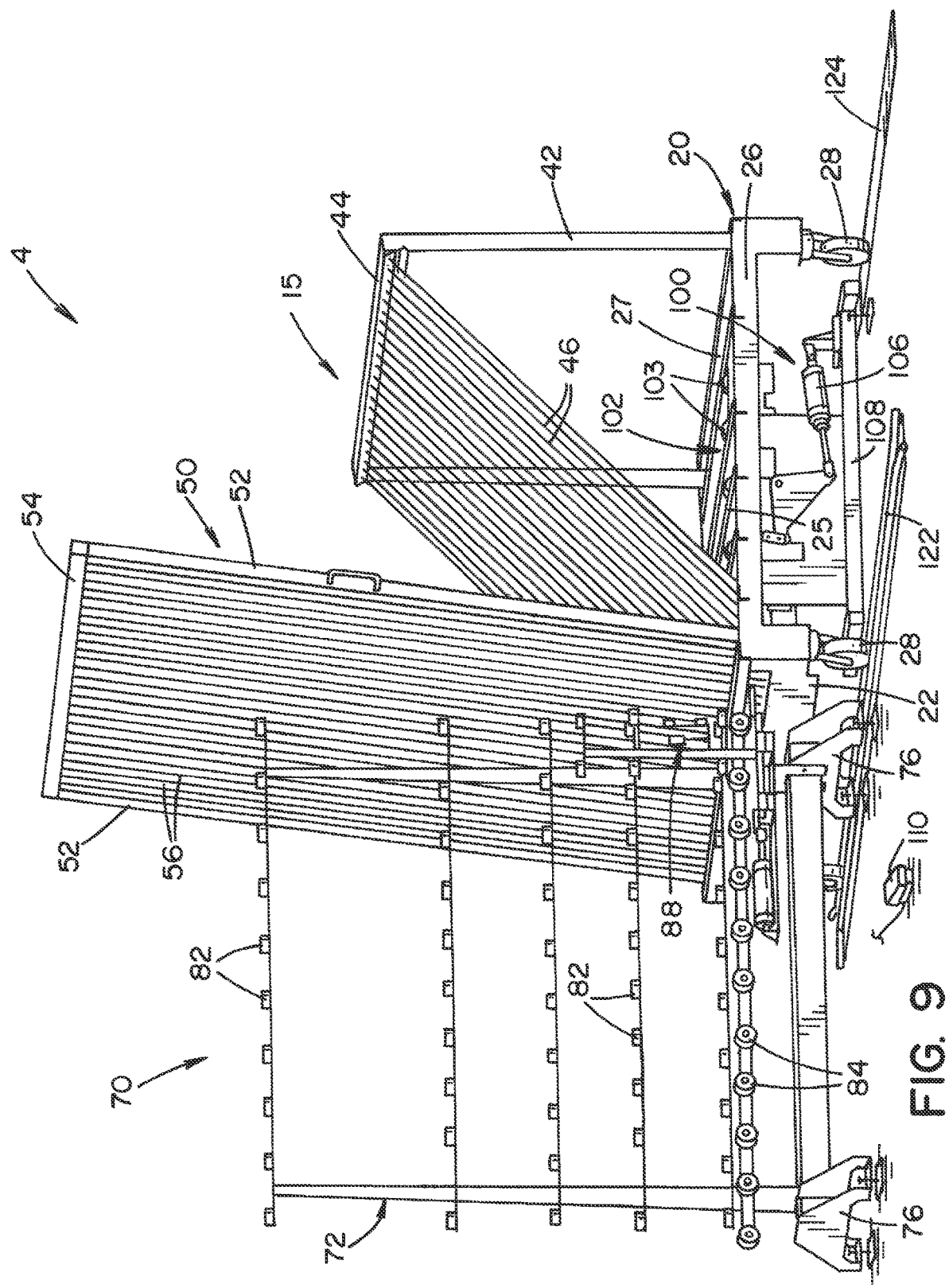
FIG. 9 is a perspective view of the manual racking system including the manual conveyance system shown in FIGS. 3-6 and the rack shown in FIGS. 1 and 2.

Indexing unit 90, best seen in FIG. 8, includes an arm 91 having a finger 92 located at a distal end thereof, one or more slotted guide elements 97, a piston/cylinder drive 96, and a mounting plate 95. The cylinder of piston/cylinder drive 96 and slotted guide elements 97 are mounted to mounting plate 95. A first end of arm 91 is attached to the distal end of the piston of piston/cylinder drive 96. A second end of arm 91 extends through the slots of slotted guide elements 97. As indicated above, finger 92 is located at a distal end of arm 91. In the illustrated embodiment, finger 92 has a front face 93 and a pair of side faces 94. Piston/cylinder drive 96 is actuated by a pneumatic actuator 110 (shown in FIG. 3) to move arm 91 of indexing unit 90 between a retracted position and an extended position. For example, pneumatic actuator 110 may take the form of a foot pedal controlled pneumatic actuator. FIG. 8A shows arm 91 in the retracted position and FIG. 8B shows arm 91 in the extended position. Operation of indexing unit 90 is described in detail below.

Figure 6:
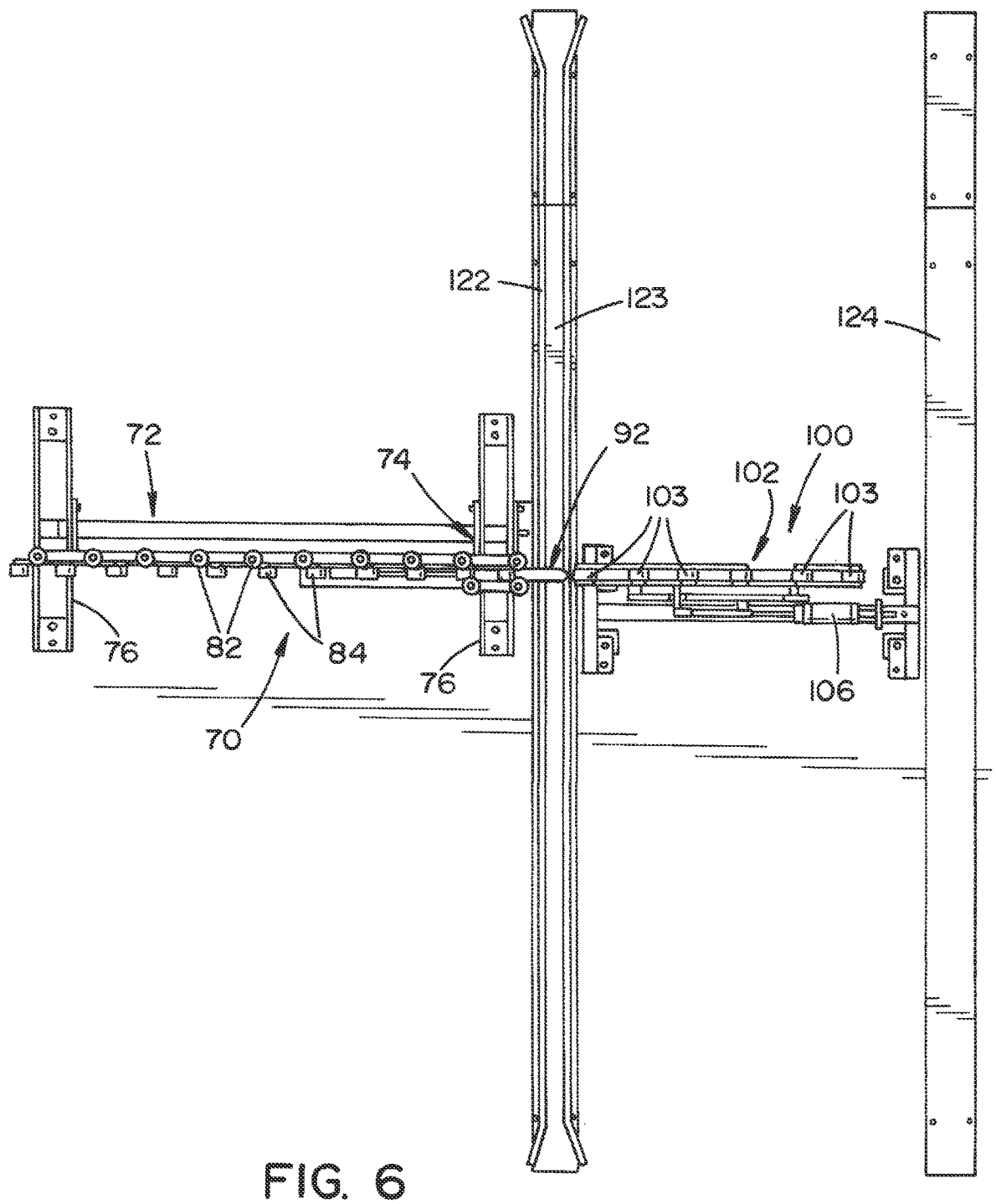
FIG. 6 is a top plan view of the conveyance system shown in FIG. 3.
Figure 7:
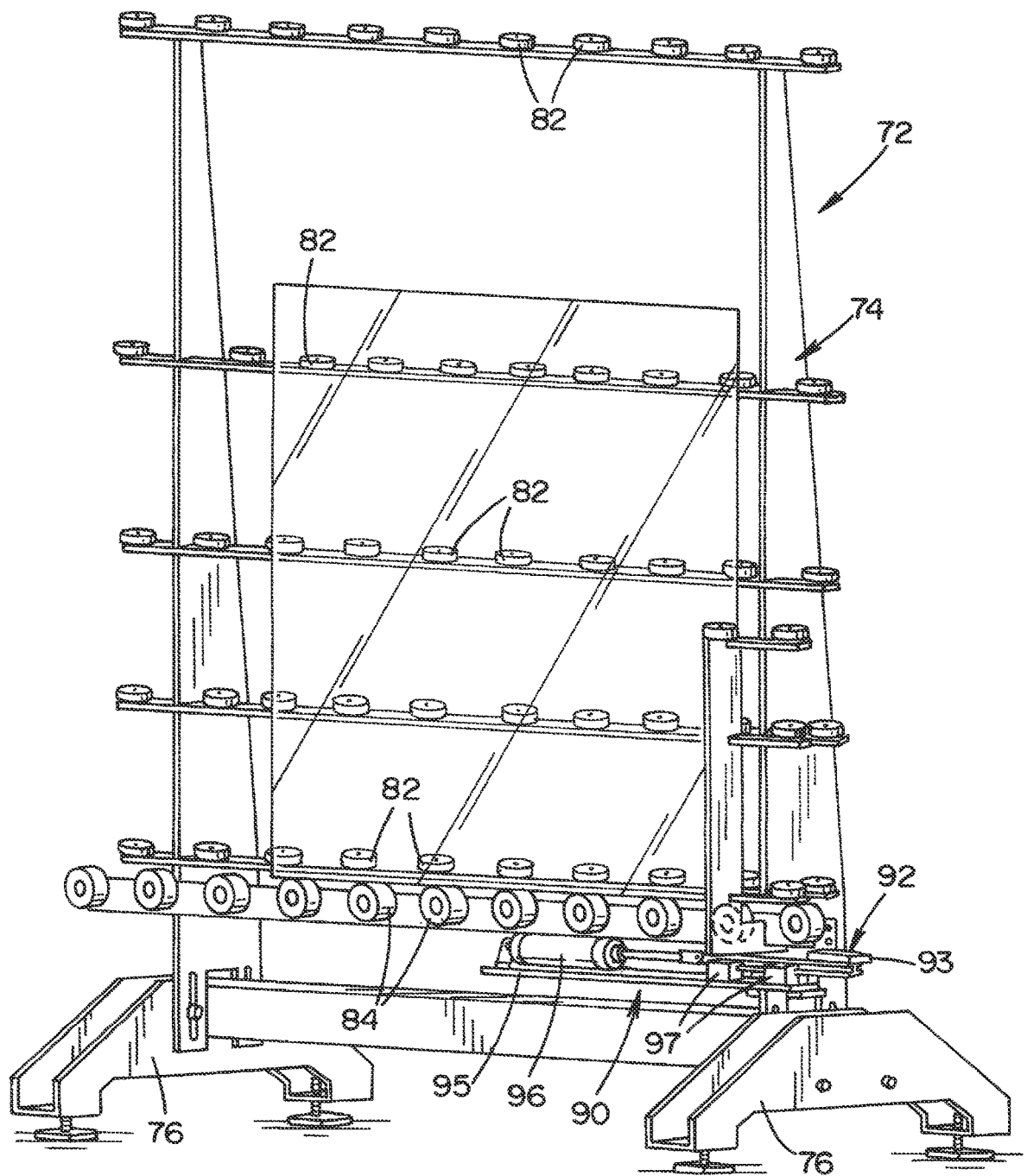
FIG. 7 is a perspective view of the vertical conveyor shown in FIG. 3.

Referring to FIGS. 3 and 6, floor track assembly 120 facilitates general alignment of a rack 15 with vertical conveyor 72, as will be explained below. Floor track assembly 120 is comprised of wheel guides 122 and 124. Wheel guide 122 includes a channel 123 that is dimensioned to receive wheels 28 of rack 15. Wheel guide 124 provides a visual guide for wheels 28 of rack 15.

Figure 11:
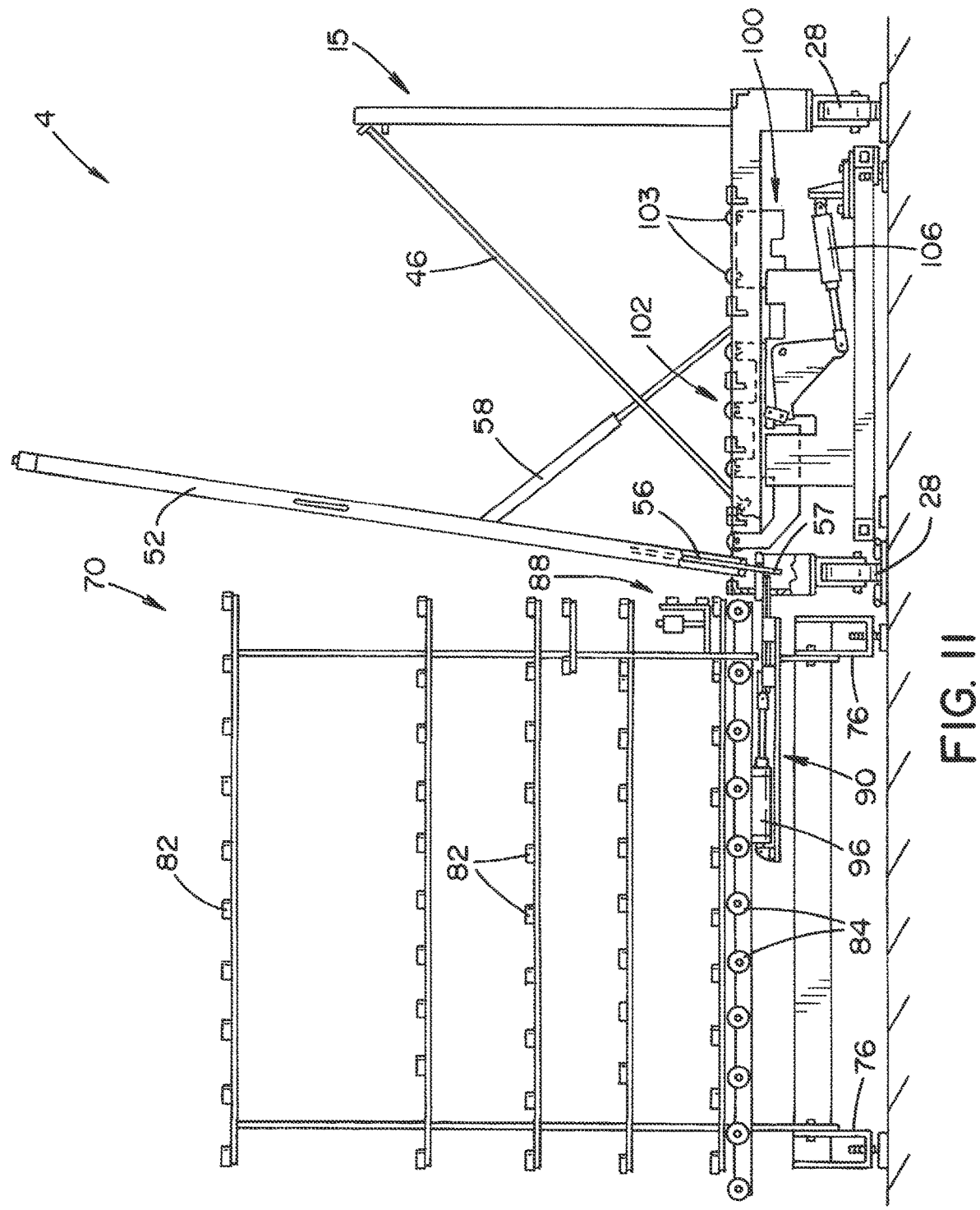
FIG. 11 is a side plan view of the manual racking system shown in FIG. 9.
Figure 12:
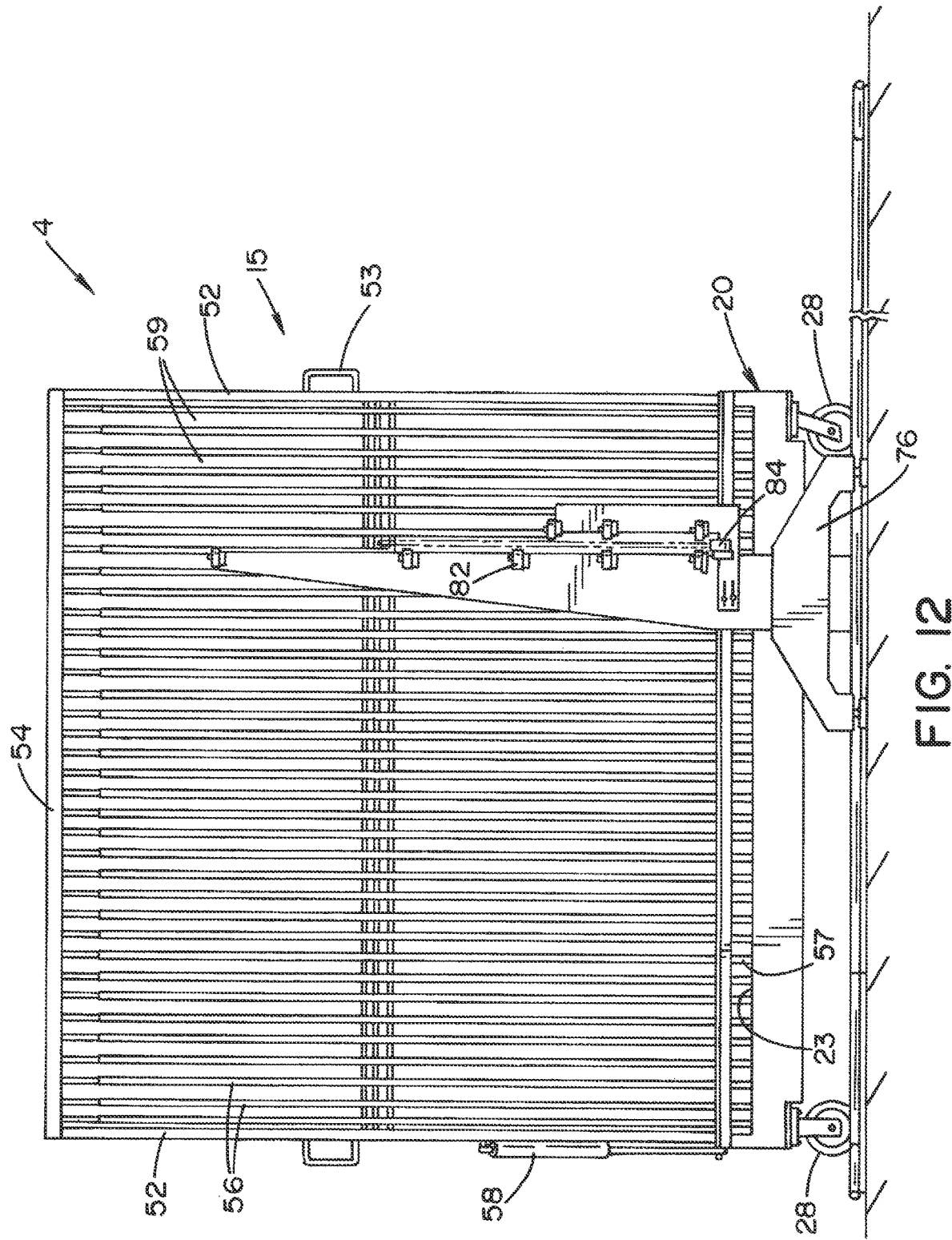
FIG. 12 is a front plan view of the manual racking system shown in FIG. 9.
Figure 13:
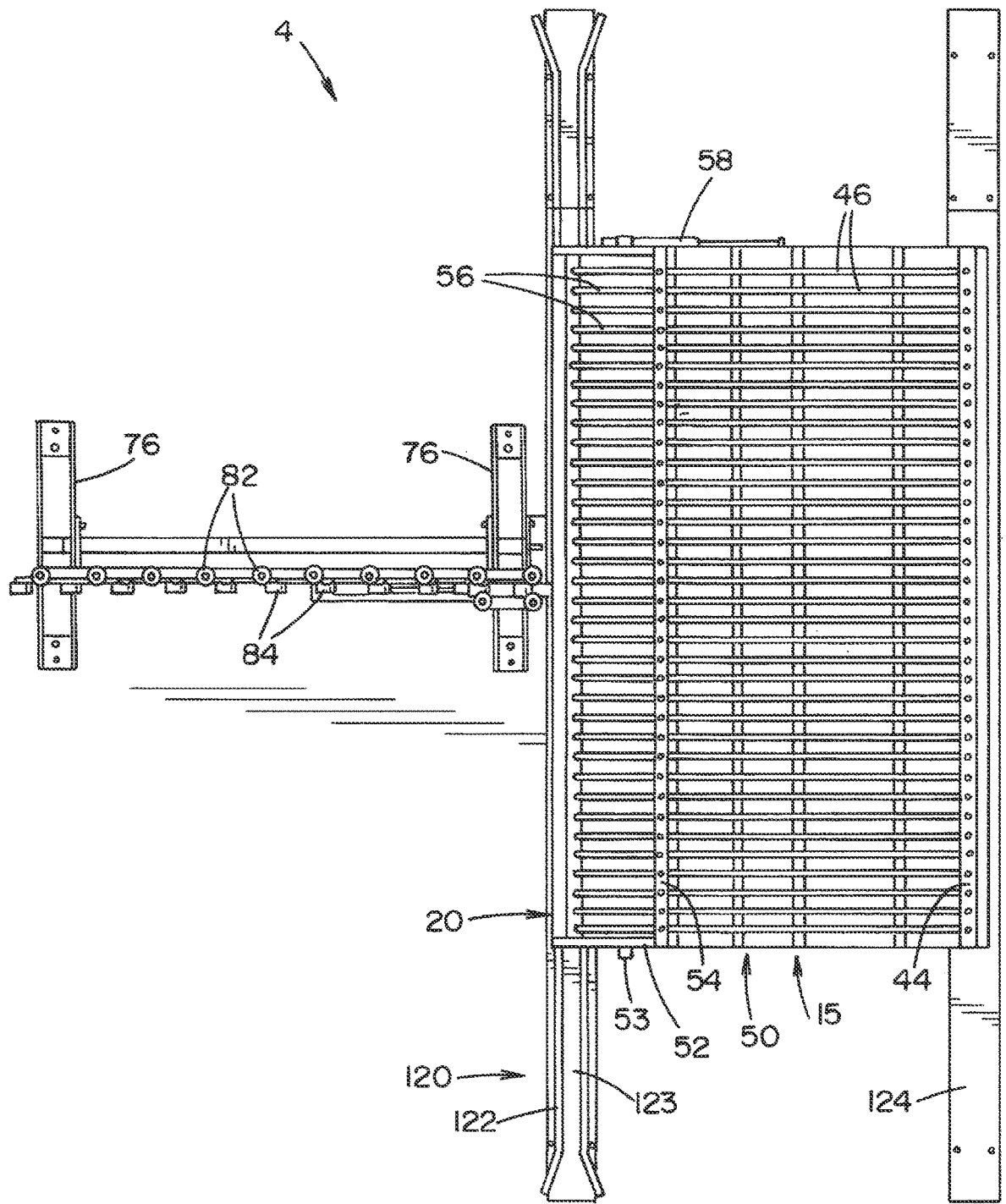
FIG. 13 is a top plan view of the manual racking system shown in FIG. 9.

Referring to FIGS. 3 and 4, pop-up roller assembly 100 is generally comprised of a roller unit 102, a piston/cylinder drive 106, and a support base 108. Roller unit 102 includes a plurality of horizontal rollers 103 that rotate about a horizontal axis. Roller unit 102 is moveable between a raised position (as best seen in FIGS. 3 and 11) and a lowered position (FIG. 4). Movement of roller unit 102 between the raised and lowered positions is driven by piston/cylinder drive 106, which is actuated by pneumatic actuator 110, which also actuates indexing unit 90. In this regard, activation of pneumatic actuator 110 simultaneously (1) moves indexing unit 90 from the retracted position to the extended position, and (2) moves roller unit 102 from the lowered position to the raised position. Likewise, deactivation of pneumatic actuator 110 simultaneously returns indexing unit 90 to the retracted position and roller unit 102 to the lowered position. It should be appreciated that when roller unit 102 is located in the raised position, horizontal rollers 103 are aligned linearly with horizontal rollers 84 of vertical conveyor 72 along a horizontal axis.

FIGS. 9-13 illustrate a manual racking system 4 comprising manual conveyance system 70 and rack 15. Operation of manual racking system 4 is described in detail below.

Referring now to FIGS. 15-23, an automated conveyance system 130 will now be described. Automated conveyance system 130 is generally comprised of a vertical tilt conveyor 132, a laser guide 158, a laser sensor 160, and a rack indexer assembly 170 that includes a frame 172, a drag chain assembly 180, and a pop-up roller assembly 200.

Figure 15:
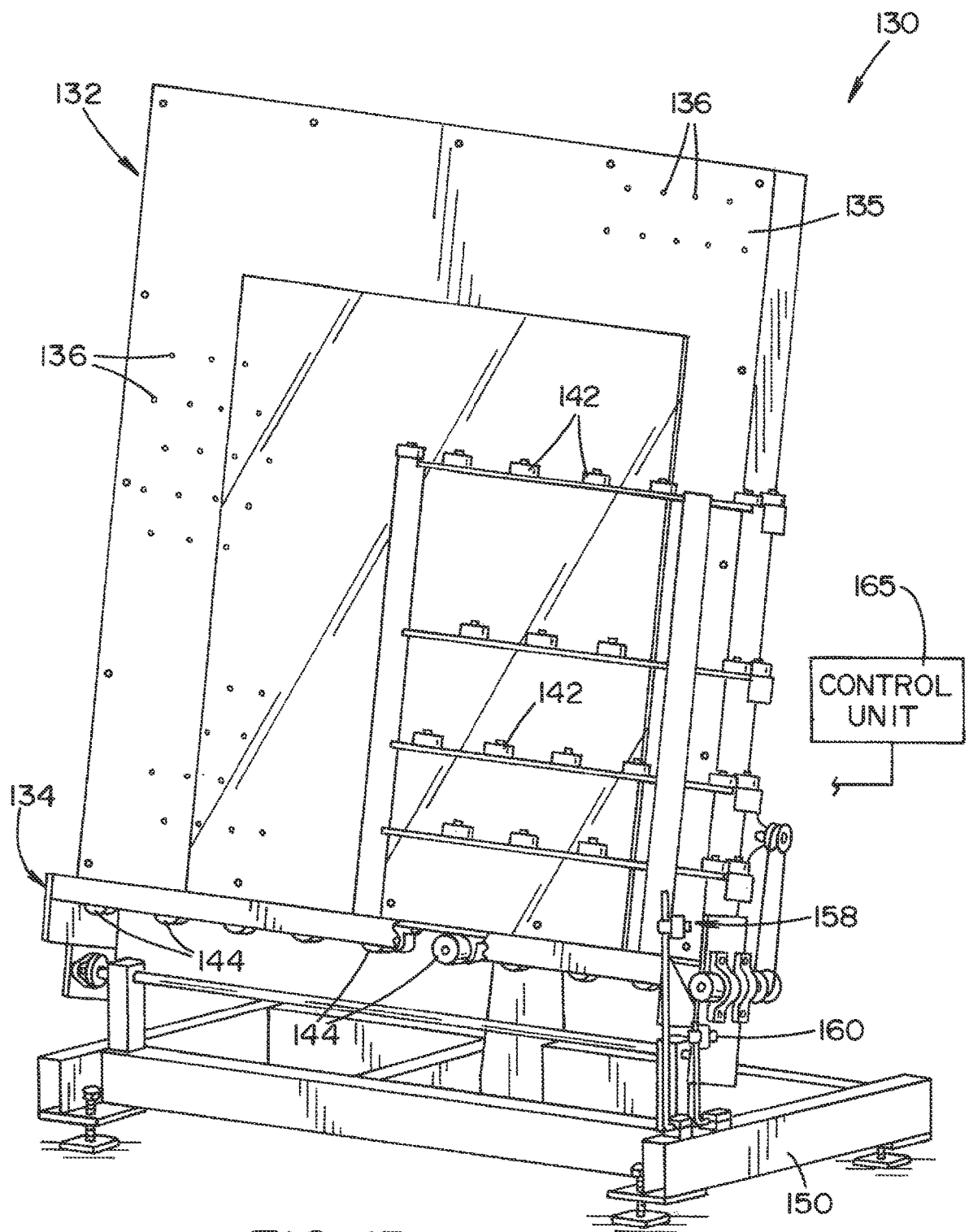
FIG. 15 is a front perspective view of a vertical tilt conveyor of an automated conveyance system for an automated racking system, according to an embodiment of the present invention.
Figure 16:
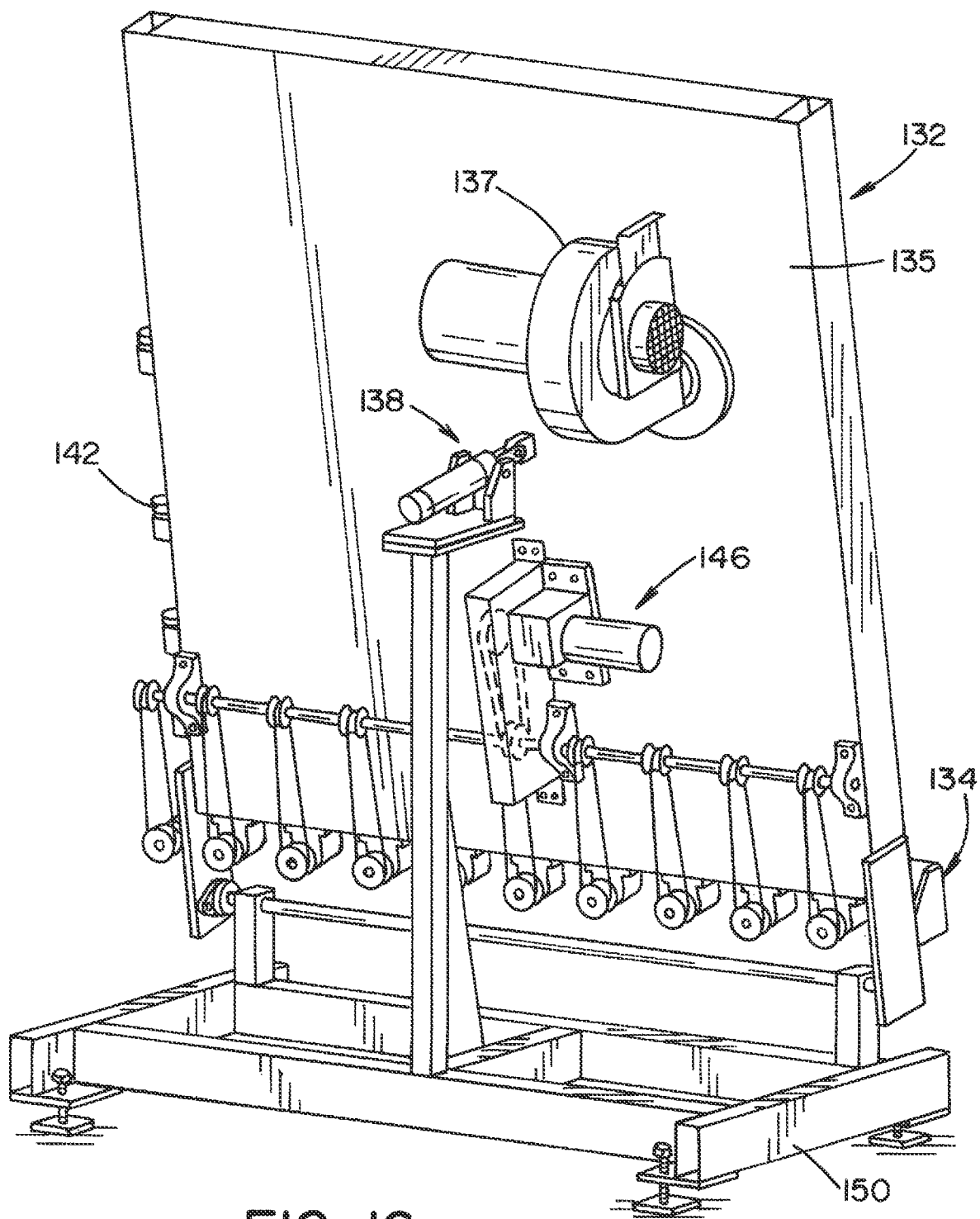
FIG. 16 is a rear perspective view of the vertical tilt conveyor shown in FIG. 15.
Figure 17:
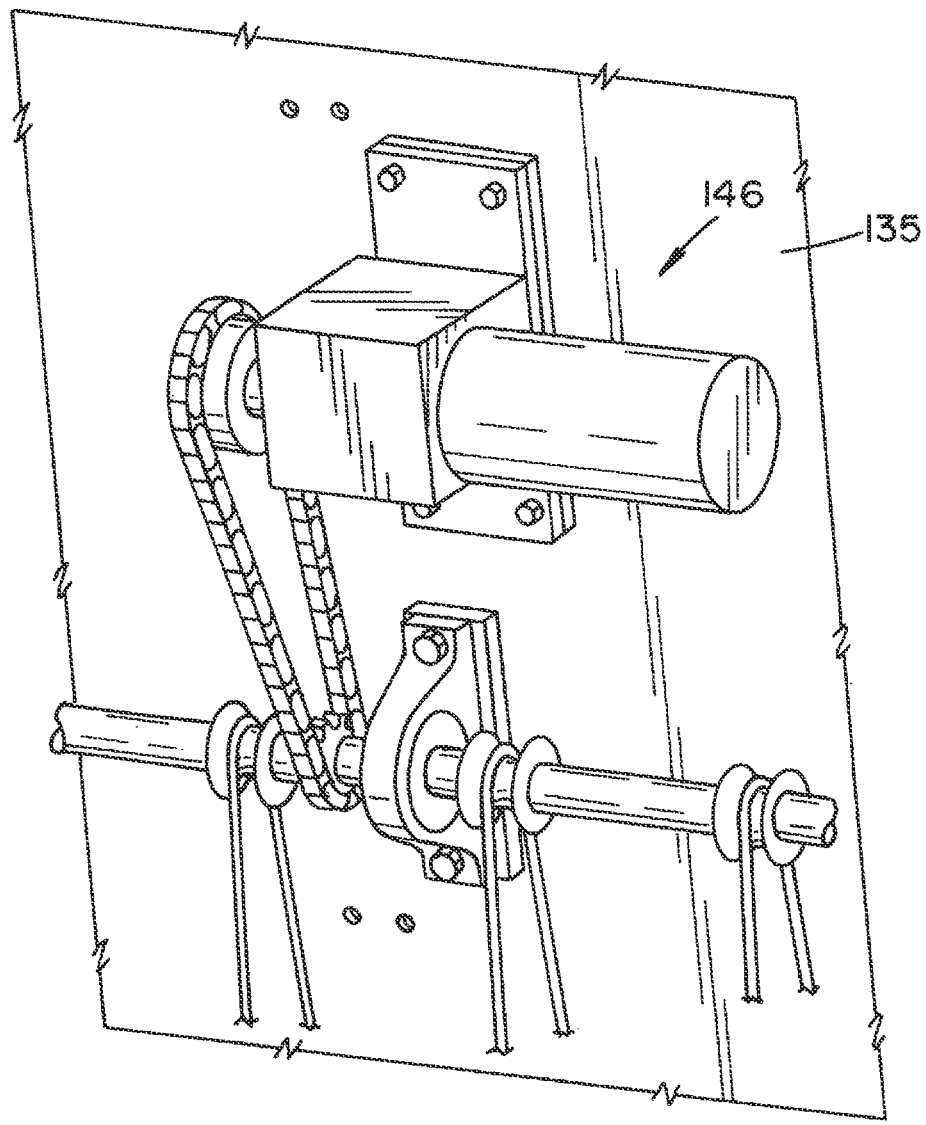
FIG. 17 is an enlarged view of a motorized drive belt system of the vertical tilt conveyor shown in FIG. 16.
Figure 18:
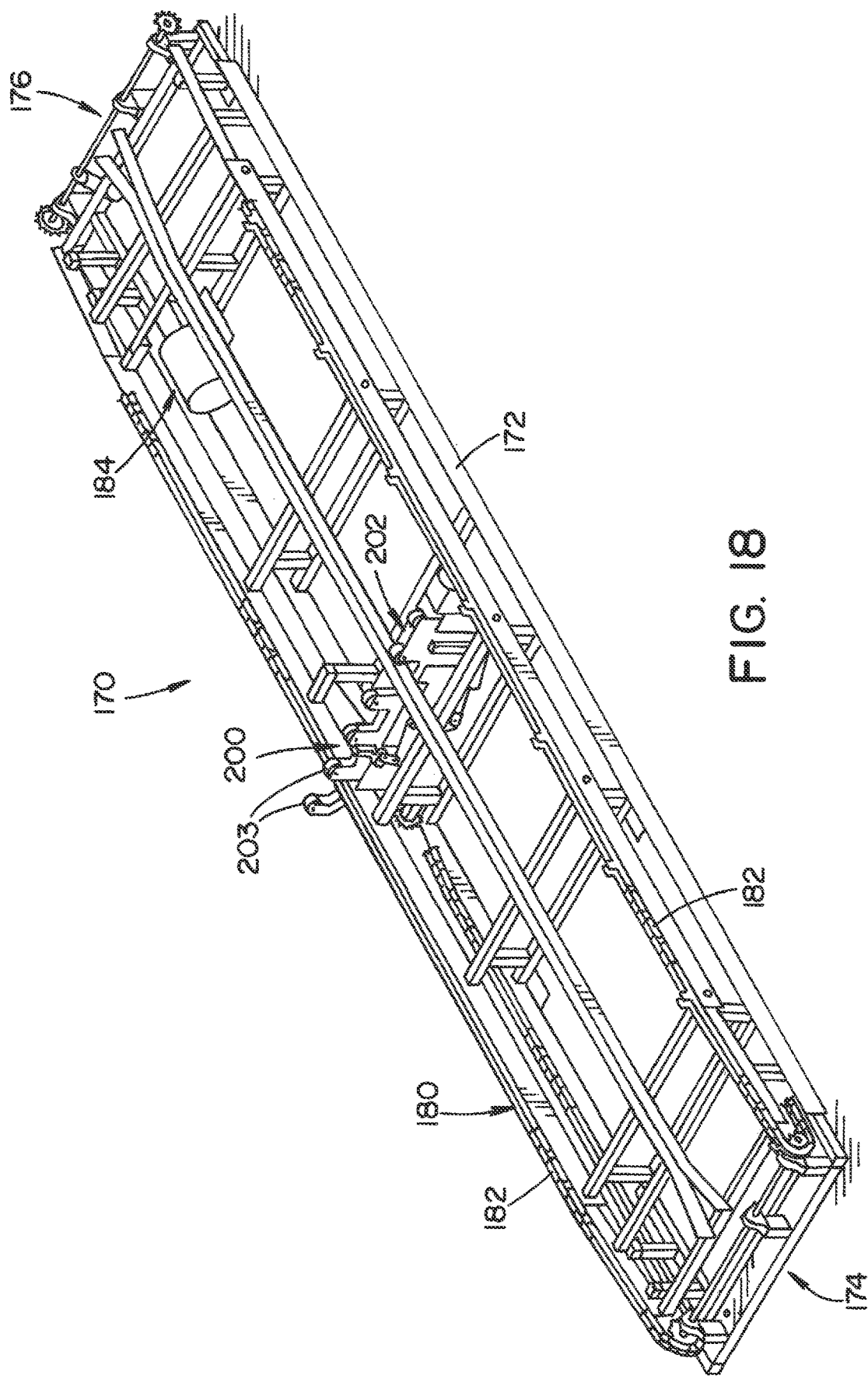
FIG. 18 is a perspective view of a rack indexer assembly of the automated conveyance system for the automated racking system, according to an embodiment of the present invention.

With reference to FIGS. 15-17, vertical tilt conveyor 132 includes a support frame 134 and a base 150. Support frame 134 includes a panel 135 that is pivotally mounted to base 150. Panel 135 includes a plurality of holes 136 that are in fluid communication with a blower unit 137. Vertical tilt conveyor 132 also includes a tilt drive 138 comprised of a piston/cylinder system for tilting panel 134. A plurality of vertical rollers 142, which rotate about a vertical axis, are mounted to support frame 134. A plurality of horizontal rollers 144 are also mounted to panel 135. Horizontal rollers 144 rotate about a horizontal axis and are driven by a motorized drive belt system 146, best seen in FIG. 17.

Laser guide 158 and laser sensor 160 are mounted to support frame 134. Laser guide 158 emits a laser beam that is directed toward a rack 15 that is located on rack indexer assembly 170. Laser sensor 160 detects reflections of the laser beam produced by laser guide 158. Operation of laser guide 158 and laser sensor 160 are described in further detail below.

Rack indexer assembly 170 will now be described with reference to FIGS. 18-23. Rack indexer assembly 170 is generally comprised of an elongated frame 172, a drag chain assembly 180, and a pop-up roller assembly 200. Elongated frame 172 defines a travel path adjacent to vertical tilt conveyor 132, and has a feed end 174 for receiving a rack 15 and an exit end 176 for outputting a rack 15. Drag chain assembly 180 engages with rack 15 and advances rack 15 along the travel path. Drain chain assembly 180 is comprised of a pair of metal chains 182 and a motorized sprocket drive assembly 184.

Figure 21:
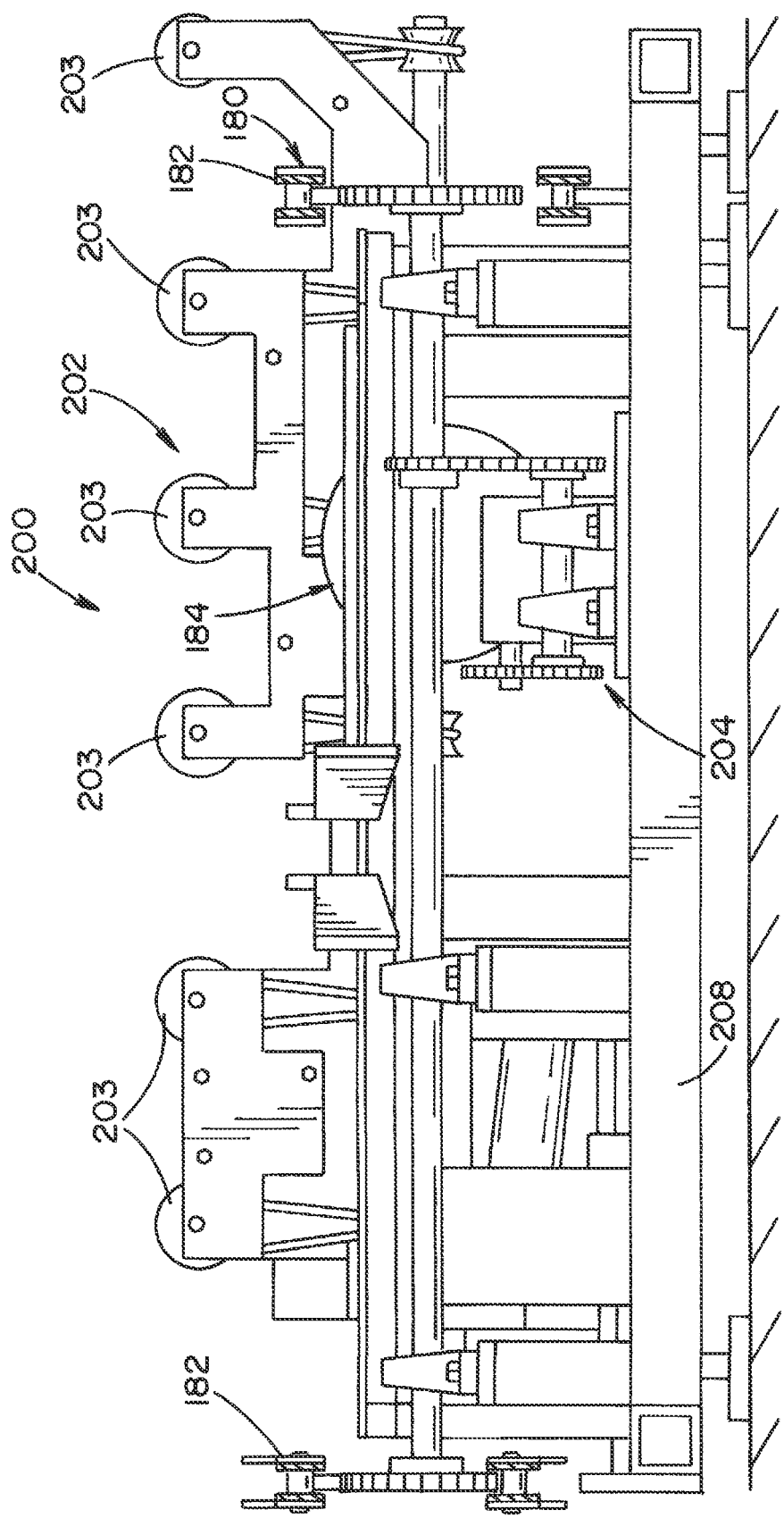
FIG. 21 is a front plan view of a pop-up roller assembly of the rack indexer assembly shown in FIGS. 18-20.
Figure 22:
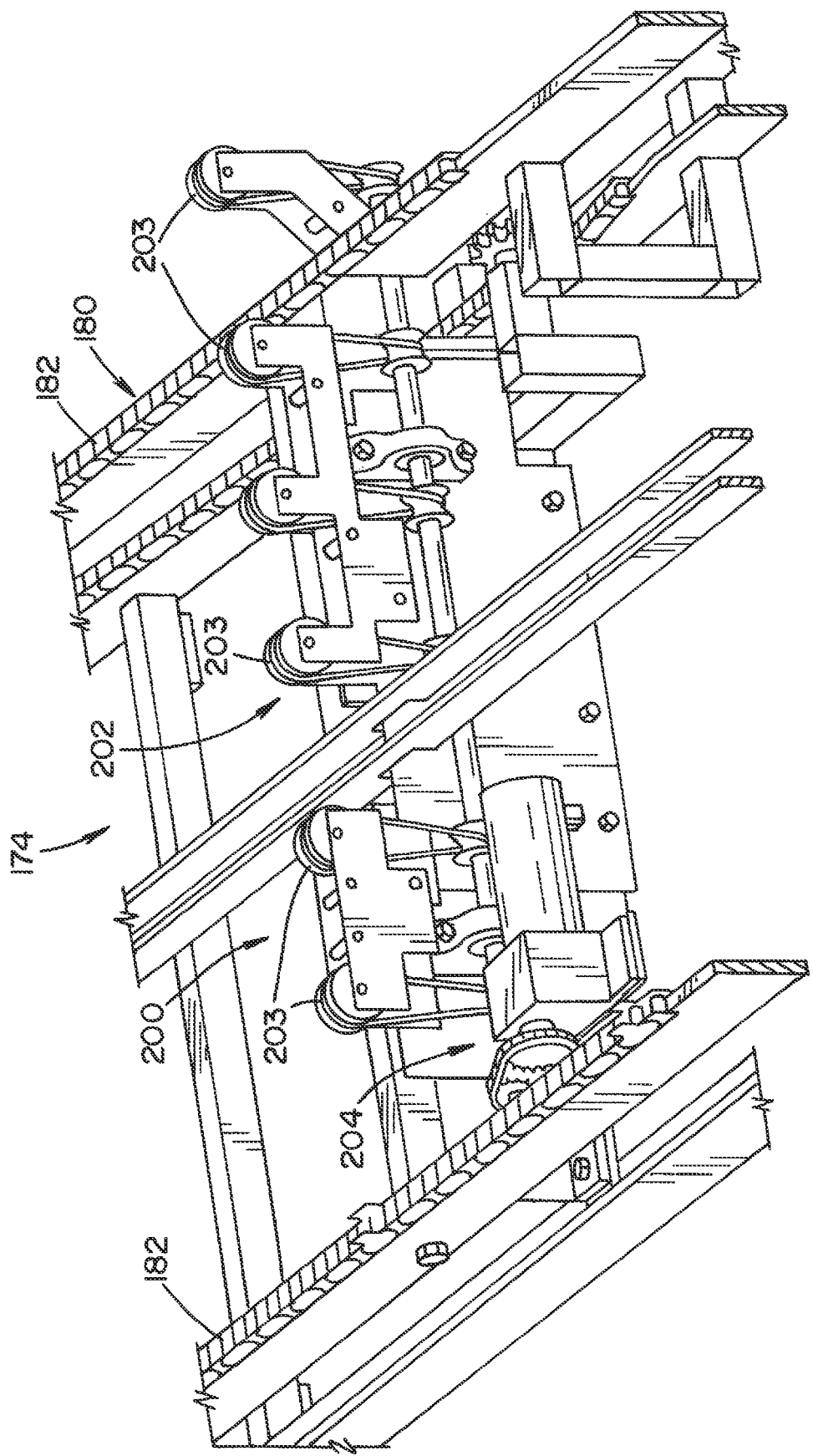
FIG. 22 is an enlarged front perspective view of a portion of the rack indexer assembly including the pop-up roller assembly.
Figure 23:
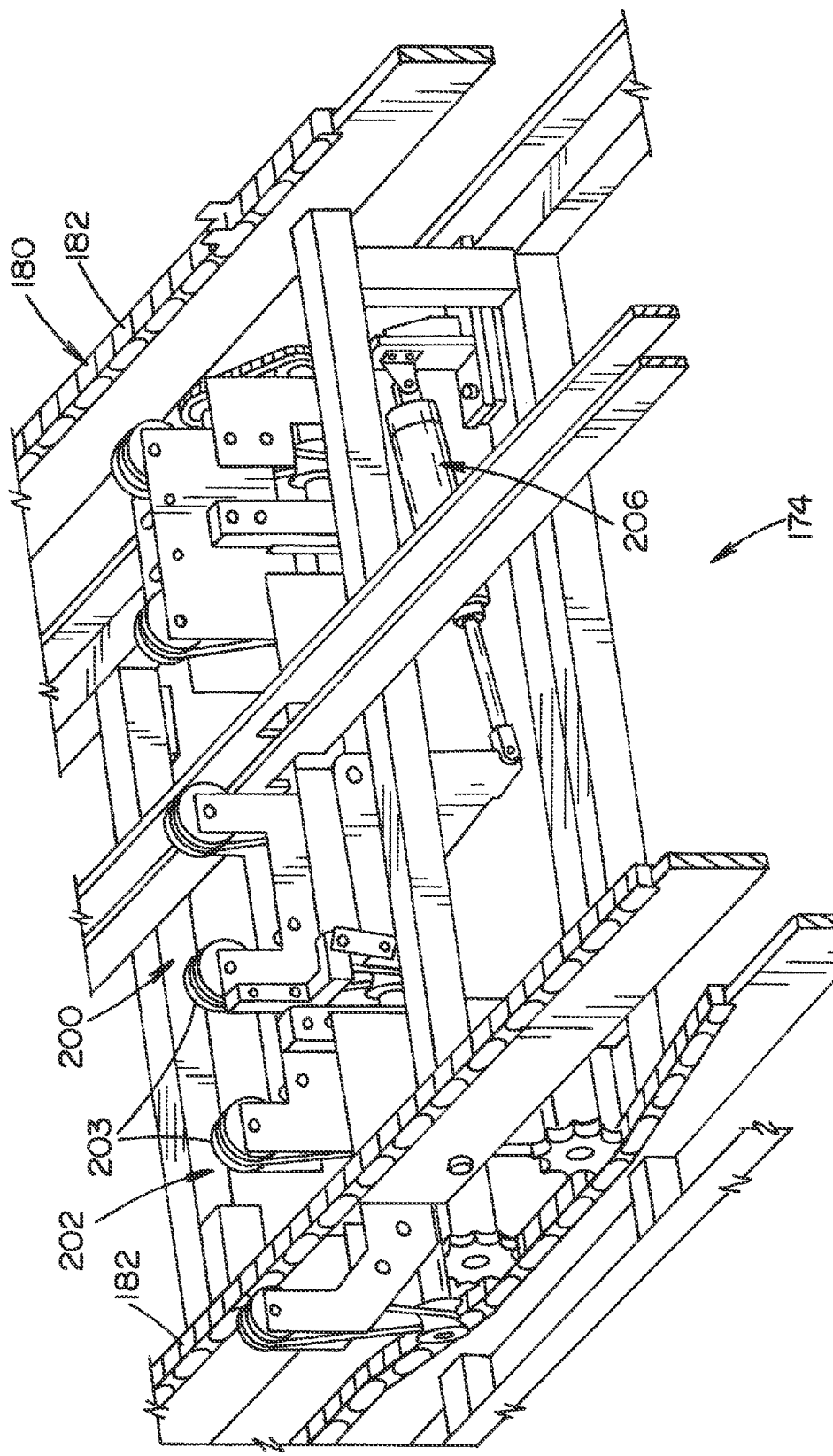
FIG. 23 is an enlarged rear perspective view of a portion of the rack indexer assembly including the pop-up roller assembly.

Pop-up roller assembly 200 is mechanically similar to pop-up roller assembly 100 described above. As best seen in FIG. 21, pop-up roller assembly 200 is comprised of a roller unit 202, a piston/cylinder drive 206, and a support base 208. Roller unit 202 includes a plurality of horizontal rollers 203 that rotate about a horizontal axis and are driven by a motorized drive belt system 204. Roller unit 202 is moveable between a raised position and a lowered position. Movement of roller unit 202 between the raised and lowered positions is driven by piston/cylinder drive 206. It should be appreciated that when roller unit 202 is located in the raised position, horizontal rollers 203 are aligned linearly with horizontal rollers 144 along a horizontal axis.

Automated conveyance system 130 also includes a control unit 165 (shown in FIG. 15) for controlling the automated loading/unloading of glass panels to/from rack 15. Control unit 165 is generally comprised of a conventional computer control system and a user interface. Control unit 165 controls operation of tilt drive 138 and motorized drive belt system 146 of vertical tilt conveyor 132, motorized sprocket drive assembly 184 of drag chain assembly 180, motorized drive belt system 204 and piston/cylinder drive 206 of pop-up roller assembly 200. Control unit 165 also receives and processes signals from laser sensor 160 that detects reflected light produced by laser guide 158 in order to determine the position of a rack 15 relative to vertical tilt conveyor 132.

Figure 24:
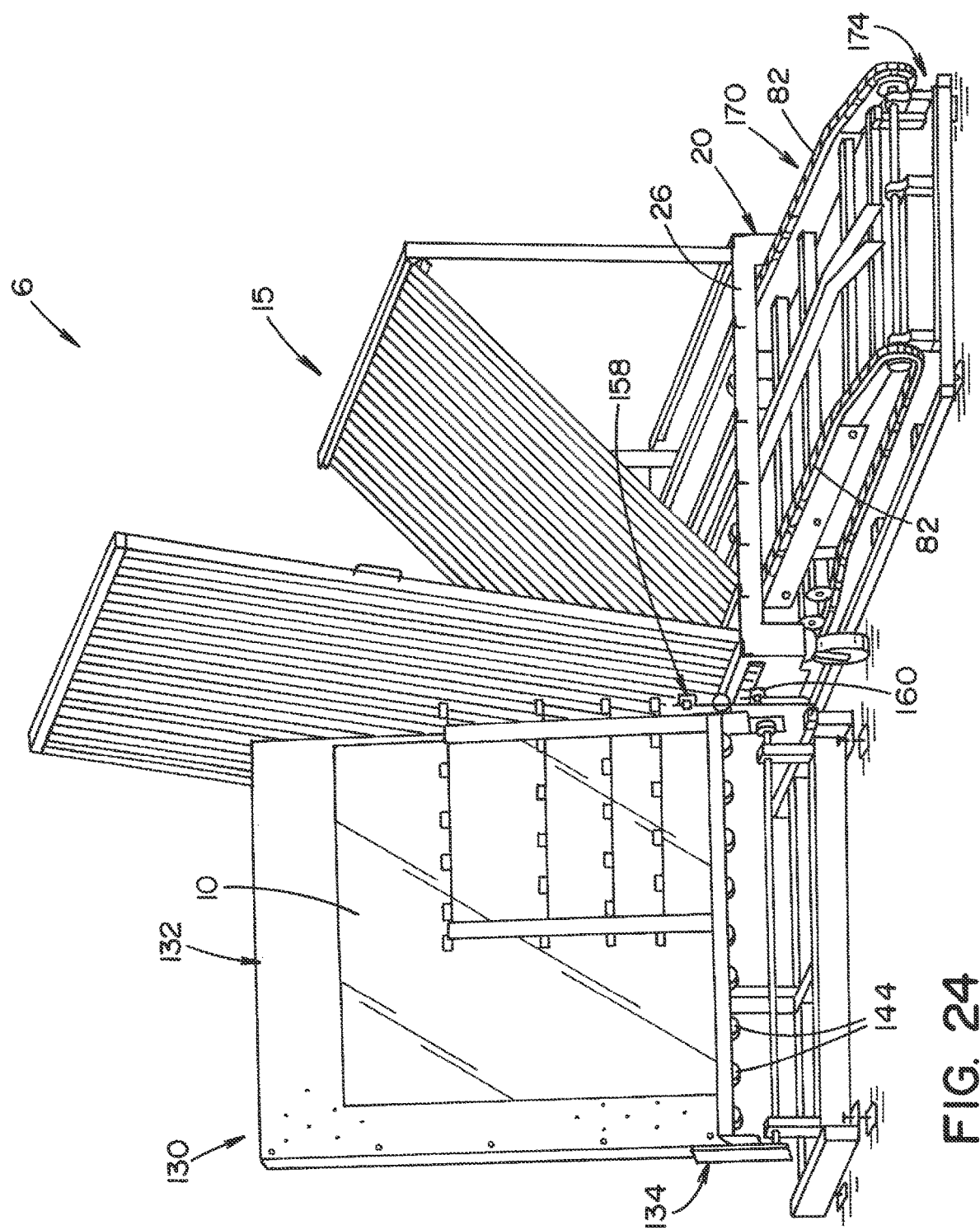
FIG. 24 is a perspective view of the automated racking system, including the conveyance system comprised of the vertical tilt conveyor, the rack indexer assembly, and the rack shown in FIGS. 1-2.

FIGS. 24-26 illustrate an automated racking system 6 comprising automated conveyance system 130 and rack 15. Operation of automated racking system 6 is described in detail below.

Figure 10:
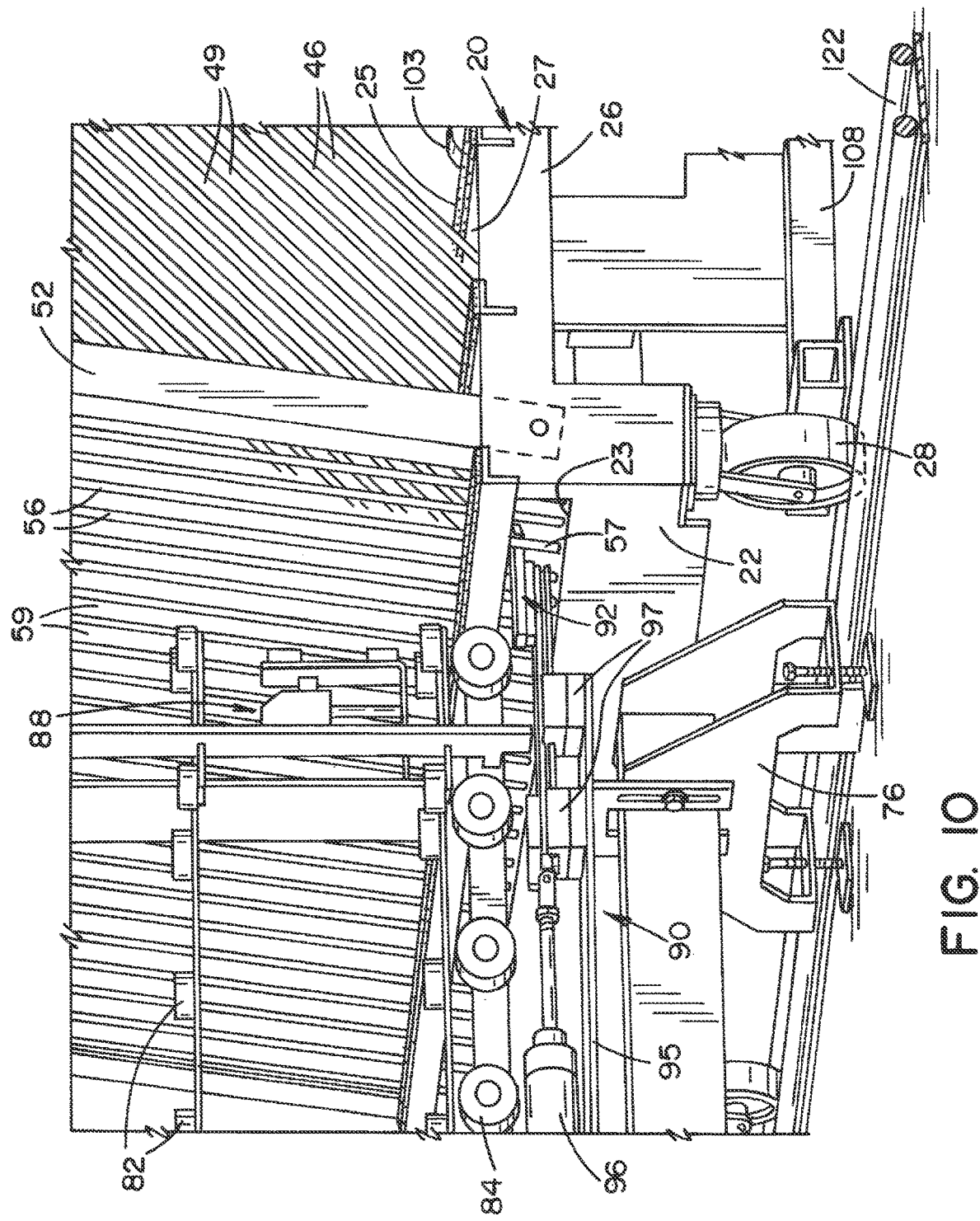
FIG. 10 is an enlarged view of a portion of the manual racking system shown in FIG. 9.

Operation of manual racking system 4 for a loading operation will now be described with particular reference to FIGS. 10 and 11. An operator guides rack 15 into position adjacent to vertical conveyor 72 by aligning wheels 28 with wheel guides 122 and 124 of floor track assembly 120. Rack 15 is placed in general alignment with vertical conveyor 72 by the operator locating rack 15 at a position whereby the laser beam of laser guide 88 projects into a slot 59 between adjacent rods 56 of pivoting rack member 50. Thereafter, rack 15 is placed in alignment with vertical conveyor 72 by the operator actuating pneumatic actuator 110. As discussed above, activation of the pneumatic actuator causes arm 91 of indexing unit to move from the retracted position (FIG. 8A) to the extended position (FIG. 8B). As arm 91 of indexing unit 90 moves to the extended position, finger 92 extends through aperture 23 of base frame 20 into a slot 59 between the lower end portions 57 of a pair of rods 56. Slots 59 defined by rods 56 are dimensioned to receive finger 92. If the general alignment is not sufficiently precise, then side faces 94 will contact one of the lower ends of the rods as arm 91 moves to the fully extended position, thereby causing rack 15 to move into alignment with vertical conveyor 72. Furthermore, in the fully extended position, finger 92 of indexing unit locks rack 15 in the aligned position relative to vertical conveyor 72.

Simultaneous with movement of arm 91 to the extended position, roller unit 102 of pop-up roller assembly 100 moves from the lowered position to the raised position. In the raised position, rollers 103 extend through openings 27 located between cross supports 25.

Once rack 15 is aligned and locked in position by finger 92 of indexing unit 90, and roller unit 102 is moved to the raised position, the operator can manually move a glass panel from vertical conveyor 72 into an aligned slot of rack 15. The aligned slot of rack 15 is defined by slot 49 of fixed rack member 40 and slot 59 of pivoting rack member 50. This movement of the glass panel is facilitated by vertical rollers 82 and horizontal rollers 84 of vertical conveyor 72, and by horizontal rollers 103 of pop-up roller assembly 100. As indicated above, according to an alternative embodiment of manual conveyance system 70, horizontal rollers 82 may be driven by a motor-driven belt system.

After the glass panel is loaded into a slot on rack 15, the operator deactivates the pneumatic actuator, thereby simultaneously causing arm 91 of indexing unit 90 to move from the extended position to the retracted position, and causing roller unit 102 to move from the raised position to the lowered position. As arm 91 moves to the retracted position, rack 15 is unlocked. As roller unit 102 moves to the lowered position, the bottom surface of the glass panel located in the slot of rack 15 is gently placed onto the top surfaces of cross supports 25. Rack 15 can now be manually advanced by the operator to align the next slot of rack 15 to be loaded with vertical conveyor 72. In accordance with the present invention, rack 15 can be loaded non-sequentially.

The foregoing steps are reversed for an unloading operation whereby glass panels are manually unloaded from rack 15 onto vertical conveyor 72.

It is contemplated that there are alternative means by which the indexing and locking function provided by use of finger 92 can implemented in accordance with the present invention. For example, in the alternative embodiment of rack 15 shown in FIG. 2A, aperture 23 of front support 22 is replaced with spaced openings 33 that are dimensioned to receive finger 92. Spaced openings 33 substitute for the function served by slots 59, defined by rods 56, located at lower end portion 57 of rods 56.

In accordance with an alternative embodiment of the present invention, the indexing unit may be adapted to align an open slot of rack 15 with horizontal rollers 84 of vertical conveyor 72, and also advance rack 15 along floor track assembly 120 such that the next slot of rack 15 is aligned with horizontal rollers 84 of vertical conveyor 72. Therefore, the indexing unit according to the alternative embodiment adds some level of automation to manual conveyance system 70, as will be described below.

Figure 14:
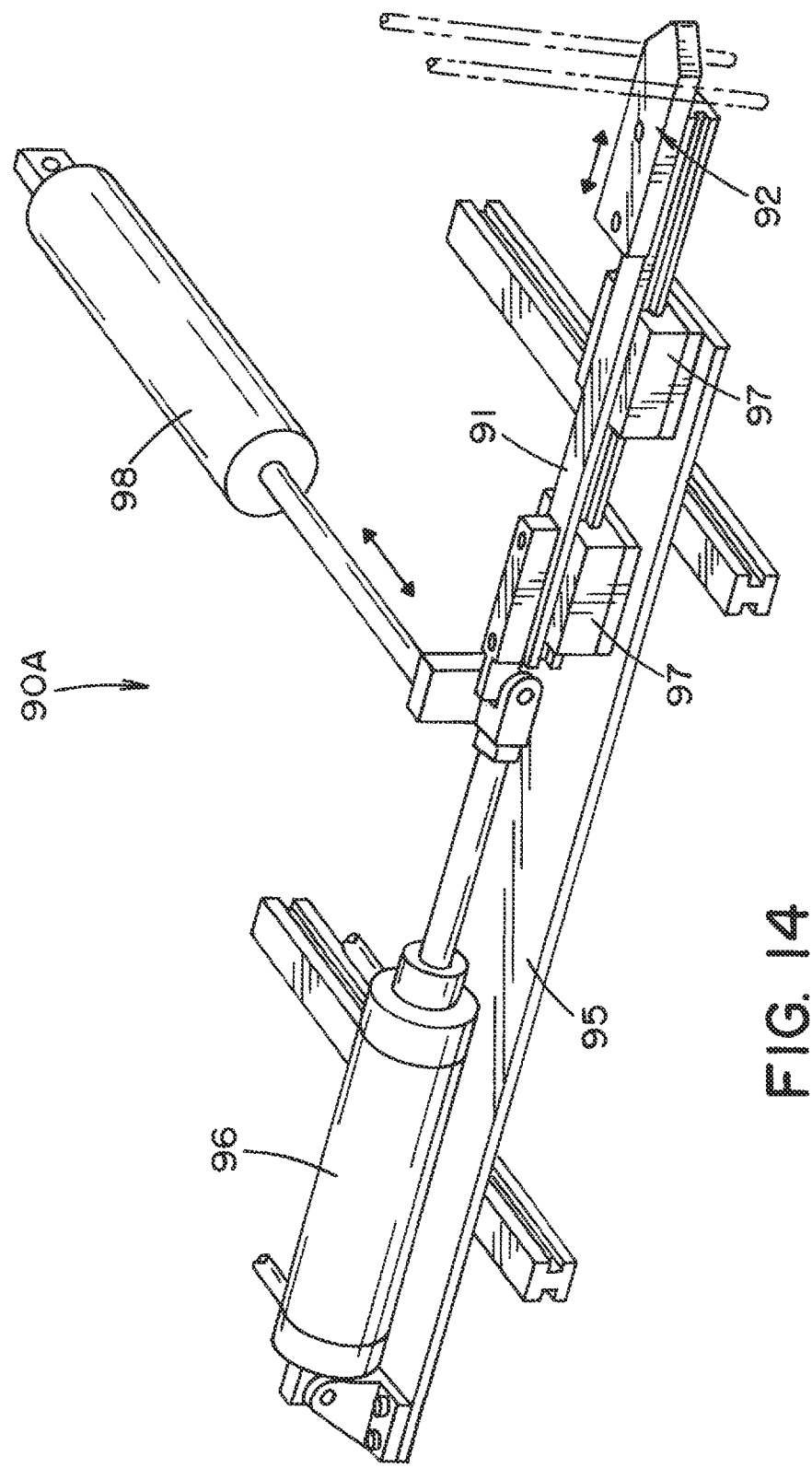
FIG. 14 is a perspective view of an indexing unit according to an alternative embodiment.
Figure 14A:
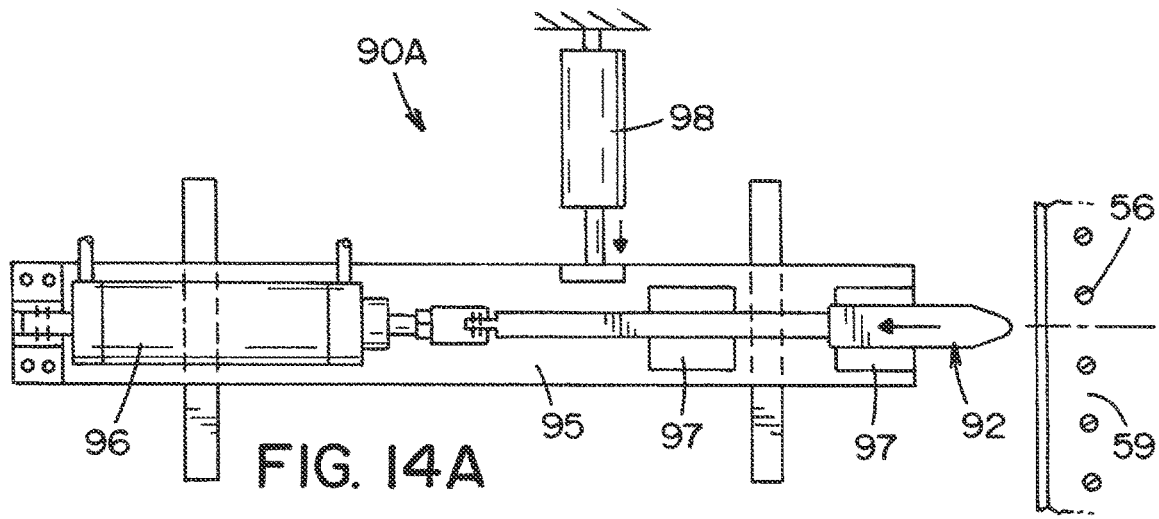
FIGS. 14A-14C illustrate operation of the indexing unit of FIG. 14 to index a rack to the manual conveyance system and to advance the rack to a new slot position.

Referring now to FIG. 14, there is shown an indexing unit 90A according to the alternative embodiment. Indexing unit 90A includes a second piston/cylinder drive 98 in addition to first piston/cylinder drive 96. The cylinder of piston/cylinder drive 98 is fixed to support frame 74 of vertical conveyor 72. The distal end of the piston of piston/cylinder drive 98 is connected to mounting plate 95. Extension of the piston of piston/cylinder drive 98 moves mounting plate 95, and thereby moves arm 91 from a home position to a forward position (FIG. 14A). Retraction of the piston of piston/cylinder drive 98 moves mounting plate such that arm 91 returns back to the home position (FIG. 14C). In this embodiment, pneumatic actuator 110 may also function to activate and deactivate piston/cylinder drive 98, wherein activation of piston/cylinder drive 98 moves arm 91 from the home position to the forward position, and deactivation of piston/cylinder drive 98 returns arm 91 from the forward position to the home position. By use of pneumatic actuator 110, movement of arm 91 between the home/forward positions may be synchronized with movement of arm 91 between the retracted/extended positions and the movement of roller unit between lowered/raised positions.

Figure 14B:
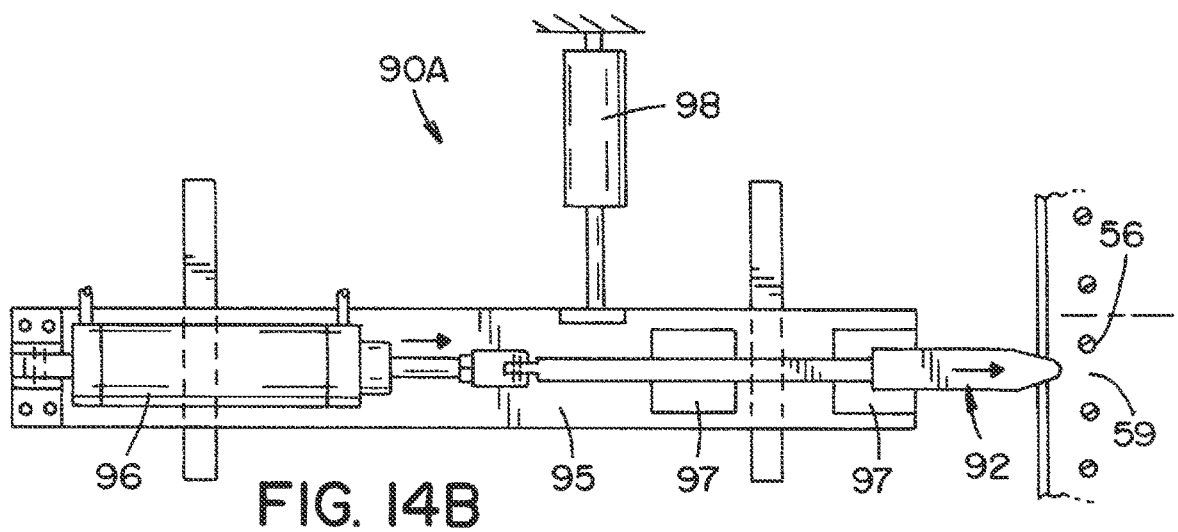
Figure 14C:
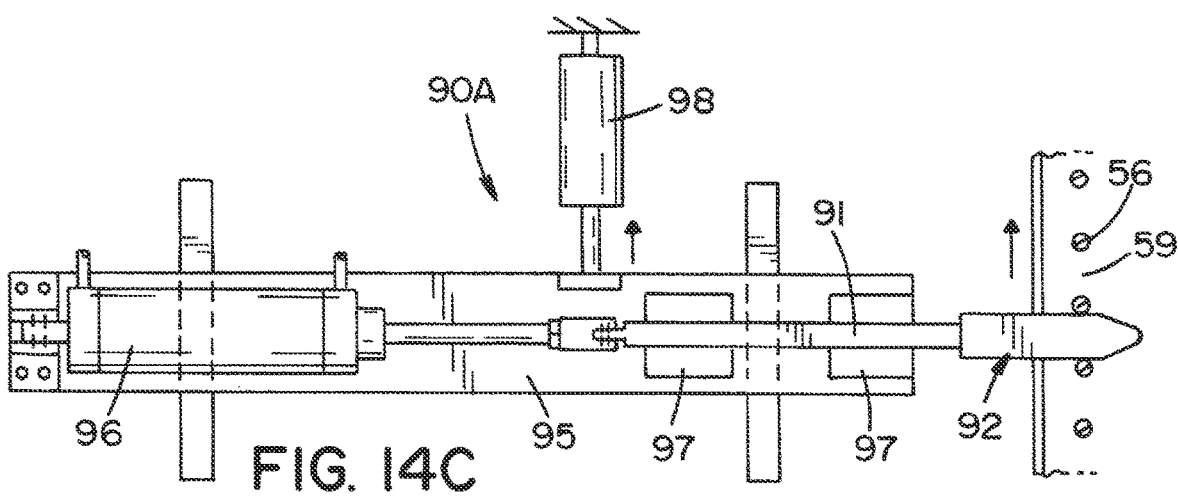

Referring now to FIG. 14A-14C, operation of indexing unit 90A will be described. In FIG. 14A the piston of drive 96 is retracted thereby moving arm 91 to the retracted position, and the piston of drive 98 is extended thereby moving arm 91 to the forward position. In the forward position, arm 91 is in alignment with the next slot of rack 15. Next, the piston of drive 96 is extended to move arm 91 to the extended position, whereby finger 92 extends through aperture 23 of base frame 20, received into a slot 59, and captured between a pair of rods 56, as shown in FIG. 14B. Thereafter, piston of drive 98 is retracted causing arm 91 to return to the home position. As arm 91 moves from the forward position to the home position it advances rack 15 along floor track assembly 120 such that the next open slot of rack is aligned with horizontal rollers 84 of vertical conveyor 72. As can be seen in FIGS. 14A-14C, piston/cylinder 96 moves arm 91 along a first axis (between the retracted and extended positions), while piston/cylinder drive 98 moves arm 91 along a second axis (between the home and forward positions), wherein the first axis is transverse to the second axis.

It should be appreciated that the operation of indexing unit 90A can be reversed to unload glass panels 10 from rack 15 onto a conveyor or other processing equipment.

Operation of automated racking system 6 for a loading operation will now be described with particular reference to FIGS. 24 and 25. An operator guides rack 15 onto rack indexer assembly 170 whereby the lower surface of side supports 26 engage with the upper surface of metal chains 82. Control unit 165 activates motorized sprocket drive assembly 184 to advance a desired slot of rack 15 into alignment with vertical tilt conveyor 132. In this regard, control unit 165 uses laser guide 158 and associated laser sensor 160 to determine alignment of rack 15 relative to conveyor 132 by sensing the laser beam light reflected by rods 56 as rack 15 moves along the travel path of rack indexer assembly 170. Once control unit 165 determines that rack 15 has moved into proper alignment with vertical tilt conveyor 132 based upon the amount of reflected light detected by laser sensor 160, control unit 165 deactivates motorized sprocket drive assembly 184 to stop advancement of rack 15 along the travel path and activates piston/cylinder drive 206 of pop-up roller assembly 200 to move roller unit 202 from the lowered position to the raised position. Thereafter, control unit 165 activates the motorized drive belt systems 146 and 204, which are respectively associated with driving horizontal rollers 144 of vertical tilt conveyor 132 and horizontal rollers 203 of pop-up roller assembly 200. As a result, glass pane 10 is automatically moved from vertical tilt conveyor 132 into an aligned slot of rack 15.

After the glass panel is loaded into a slot of rack 15, control unit 165 deactivates motorized drive belt systems 146 and 204, and causes piston/cylinder drive 206 of pop-up roller assembly 200 to return roller unit 202 from the raised position to the lowered position. As roller unit 202 moves to the lowered position, the bottom surface of the glass panel is gently placed onto the top surfaces of cross supports 25.

Next, control unit 165 activates motorized sprocket drive assembly 184 to advance rack 15 along the travel path to locate the next slot of rack 15 into alignment with vertical tilt conveyor 132. In this manner, control unit 165 is operable to automatically index each slot of rack 15 to load glass panels from vertical tilt conveyor 132. It should be appreciated that control unit 165 of automated racking system 6 can be programmed to load rack 15 non-sequentially.

The foregoing steps are reversed for an unloading operation whereby glass panels are unloaded from rack 15 onto a conveyor or other processing equipment.

It is contemplated that there are alternative means by which the indexing function of the automated conveyance system 130 can be implemented in accordance with the present invention. For example, reflective elements or other markings can be used by control unit 165 to detect the position of rack 15 relative to vertical tilt conveyor 132 as it advances along the travel path of rack indexer assembly 170.

The foregoing describes specific embodiments of the present invention. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. An automated racking system for use with a production line for production of glass panels, said system comprising:
    a rack for transporting glass panels;
    a rack indexer assembly for transporting the rack along a travel path, said rack indexer assembly including:
        a frame defining the travel path for loading and unloading glass panels to/from the rack, said frame having a feed end for receiving the rack and an exit end for outputting the rack,
        a motor-driven assembly mounted to the frame for advancing the rack along the travel path, and
        a pop-up roller assembly having a roller unit comprised of a plurality of motor-driven rollers, said roller unit movable between a lowered position and a raised position, wherein in the raised position, glass panels are loaded/unloaded onto/from the rack; and
    a control unit for controlling the motor-driven assembly and controlling movement of the roller unit between the lowered and raised positions.

2. The automated racking system of claim 1, wherein the motor-driven assembly engages with the rack to advance the rack along the travel path.

3. The automated racking system of claim 2, wherein the motor-driven assembly is a motor-driven drag chain assembly mounted to the frame and controlled by the control unit.

4. The automated racking system of claim 1, wherein the rack indexer assembly further includes:
    a laser guide for emitting a laser beam; and
    a laser sensor,
    wherein said laser guide and said laser sensor are used by the control unit to determine a position of the rack along the travel path.

5. A system for producing glass panels comprising:
processing equipment for a glass panel production line, said processing equipment having a plurality of rollers mounted thereto;
a rack for transporting glass panels;
a rack indexer assembly for transporting the rack along a travel path, said rack indexing assembly including:
   a frame defining the travel path for loading and unloading glass panels to/from the rack, said frame having a feed end for receiving the rack and an exit end for outputting the rack,
   a motor-driven assembly mounted to the frame for advancing the rack along the travel path, and
   a pop-up roller assembly having a roller unit comprised of a plurality of motor-driven rollers, said roller unit movable between a lowered position and a raised position, wherein in the raised position, the plurality of rollers of the roller unit align linearly along a horizontal axis with the plurality of rollers of the processing equipment; and
a control unit for controlling the motor-driven assembly and controlling movement of the roller unit between the lowered and raised positions.

6. The system according to claim 5, wherein the motor-driven assembly engages with the rack to advance the rack along the travel path.

7. The system according to claim 6, wherein the motor-driven assembly is a motor-driven drag chain assembly mounted to the frame and controlled by the control unit.

8. The system according to claim 5, wherein the rack indexer assembly further includes:
a laser guide for emitting a laser beam; and
a laser sensor,
wherein said laser guide and said laser sensor are used by the control unit to determine a position of the rack along the travel path.

9. A rack indexer assembly for transporting a rack along a travel path of a production line having processing equipment for production of glass panels, said rack indexer assembly including:
a frame defining the travel path for loading and unloading the glass panels to/from the rack, said frame having a feed end for receiving the rack and an exit end for outputting the rack;
a motor-driven assembly mounted to the frame for advancing the rack along the travel path; and
a pop-up roller assembly having a roller unit comprised of a plurality of motor-driven rollers, said roller unit movable between a lowered position and a raised position, wherein in the raised position, glass panels are loaded/unloaded onto/from the rack.

10. The rack indexer assembly according to claim 9, wherein the motor-driven assembly engages with the rack to advance the rack along the travel path.

11. The rack indexer assembly according to claim 10, wherein the motor-driven assembly is a motor-driven drag chain assembly mounted to the frame and controlled by a control unit.

12. The rack indexer assembly according to claim 9, further comprising:
a laser guide for emitting a laser beam; and
a laser sensor,
wherein said laser guide and said laser sensor are used by the control unit to determine a position of the rack along the travel path.

* * * * *